US012745044B2

(12) United States Patent
Ye

(10) Patent No.: US 12,745,044 B2
(45) Date of Patent: Sep. 22, 2026

(54) SOUND APPARATUS

(71) Applicant: LG DISPLAY CO., LTD., Seoul (KR)

(72) Inventor: Jaehun Ye, Tokyo (JP)

(73) Assignee: LG Display Co., Ltd., Seoul (KR)

( * ) Notice: Subject to any disclaimer, the term of this patent is extended or adjusted under 35 U.S.C. 154(b) by 151 days.

(21) Appl. No.: 18/751,568

(22) Filed: Jun. 24, 2024

(65) Prior Publication Data

US 2025/0008274 A1 Jan. 2, 2025

(30) Foreign Application Priority Data

Jun. 30, 2023 (JP) ................................ 2023-108763

(51) Int. Cl.
*H04R 17/00* (2006.01)

(52) U.S. Cl.
CPC .................................... *H04R 17/00* (2013.01)

(58) Field of Classification Search
CPC .......... H04R 17/00; H04R 7/04; H04R 1/028; H04R 2307/00; H04R 240/05; H04R 2499/15
See application file for complete search history.

(56) References Cited

U.S. PATENT DOCUMENTS 7,635,941 B2 * 12/2009 Bank ........................ H04R 7/18
310/348

FOREIGN PATENT DOCUMENTS

EP 4231664 A2 * 8/2023 .............. H04R 9/06
KR 10-2018-0077582 A 7/2018
KR 10-2310176 B1 10/2021
KR 10-2320360 B1 11/2021
KR 10-2370837 B1 3/2022

* cited by examiner

*Primary Examiner* — Sunita Joshi
(74) *Attorney, Agent, or Firm* — Fish & Richardson P.C.

(57) ABSTRACT

A sound apparatus includes a first vibration member, a first vibration device having a rectangular shape including a first main surface and a second main surface opposite to each other and configured to vibrate based on a driving signal input thereto, the first main surface being connected to the first vibration member, a second vibration member having a rectangular shape including a first main surface and a second main surface opposite to each other, a portion of the first main surface being connected to the first vibration member and a portion of the second main surface of the first vibration device by an elastic member, and a second vibration device having a rectangular shape including a first main surface and a second main surface opposite to each other and configured to vibrate based on a driving signal input thereto, the first main surface being connected to the second main surface of the second vibration member. The first vibration device may be disposed in a direction in which rotation has been performed by a certain angular degree with respect to an axis perpendicular to the first main surface of the second vibration device and the second main surface of the second vibration device.

29 Claims, 14 Drawing Sheets

SOUND APPARATUS

CROSS-REFERENCE TO RELATED APPLICATION

This application claims the priority of Japanese Patent Application No. 2023-108763, filed on Jun. 30, 2023, the entirety contents of which is hereby expressly incorporated by reference into the present application.

BACKGROUND

Field of the Disclosure

The present disclosure relates to a sound apparatus.

Description of the Background

Vehicles include a sound apparatus which outputs a sound based on an audio signal output from a multimedia device such as a car audio device. For example, the sound apparatus applied to vehicles may include a front speaker and a rear speaker, which are configured as a coil type.

SUMMARY

Piezoelectric devices used to piezoelectric speakers are limited in vibration width (or displacement width), and due to this, there is a case where a sound pressure level is not sufficient.

The present disclosure has been implemented based on such a problem and is to provide a sound apparatus for enhancing sound quality.

Additional features, advantages, and aspects will be set forth in the description that follows, and in part will be apparent from the description, or may be learned by practice of the inventive concepts provided herein. Other features, advantages, and aspects of the present disclosure may be realized and attained by the structure particularly pointed out in the written description, or derivable therefrom, and the claims hereof as well as the appended drawings.

To achieve these and other advantages and aspects of the present disclosure, as embodied and broadly described herein, in one or more aspects, a sound apparatus may comprise a first vibration member; a first vibration device having a rectangular shape including a first main surface and a second main surface opposite to each other and configured to vibrate based on a driving signal input thereto, the first main surface being connected to the first vibration member; a second vibration member having a rectangular shape including a first main surface and a second main surface opposite to each other, a portion of the first main surface being connected to the first vibration member and a portion of the second main surface of the first vibration device by an elastic member; and a second vibration device having a rectangular shape including a first main surface and a second main surface opposite to each other and configured to vibrate based on a driving signal input thereto, the first main surface being connected to the second main surface of the second vibration member. The first vibration device may be disposed in a direction in which rotation has been performed by a certain angular degree with respect to an axis perpendicular to the first main surface of the second vibration device and the second main surface of the second vibration device.

In one or more aspects, a sound apparatus may comprise a first vibration member, a second vibration member overlapping the first vibration member and having a size which is smaller than a size of the first vibration member, a first vibration device disposed between the first vibration member and the second vibration member and connected to the first vibration member, and a second vibration device connected to the second vibration member. The second vibration member may be configured to be connected to the first vibration device and the first vibration member.

In one or more aspects, a sound apparatus may comprise a first vibration plate having a rectangular shape including a first surface and a second surface opposite to each other, a first vibration device coupled to the first vibration plate, a second vibration plate having a rectangular shape including a first surface and a second surface opposite to each other, a second vibration device coupled to the second vibration plate, a first elastic member disposed between the first vibration plate and the second vibration plate, and coupled the first vibration plate to the second vibration plate, and a second elastic member disposed between the first vibration device and the second vibration plate, and coupled the first vibration device to the second vibration plate.

According to one or more aspects of the present disclosure, a sound apparatus where sound quality is enhanced may be provided.

According to one or more aspects of the present disclosure, a sound apparatus where a sound characteristic and/or a sound pressure level characteristic of a sound of a low-pitched sound band is enhanced may be provided.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and aspects of the disclosure and together with the description serve to explain principles and examples of the disclosure.

In the drawings.

Figure 1:
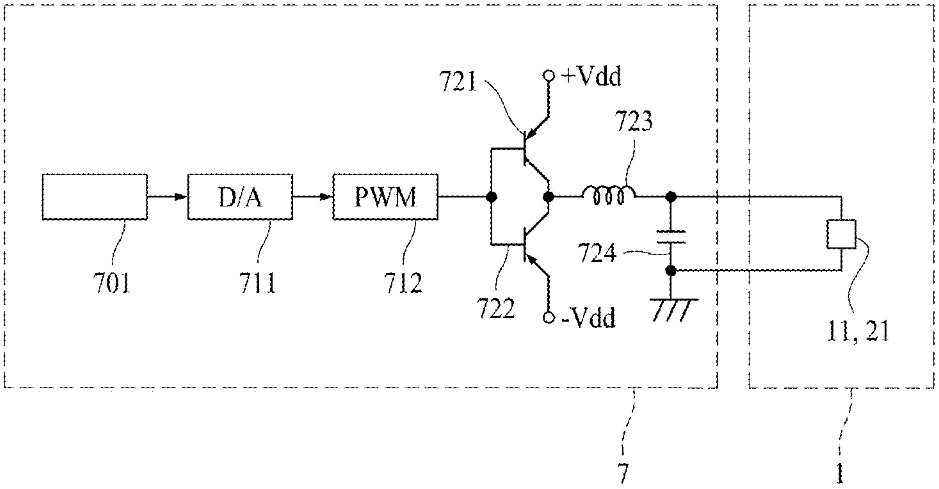
FIG. 1 illustrates a configuration of a sound apparatus and a host system according to a first aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and convenience.

DETAILED DESCRIPTION

Reference is now made in detail to aspects of the present disclosure, examples of which may be illustrated in the accompanying drawings. In the following description, when a detailed description of well-known methods, functions, structures or configurations may unnecessarily obscure aspects of the present disclosure, a detailed description of such known functions or configurations may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements may be added unless a term such as "only" or the like is used. The terms used in the present disclosure are merely used to describe particular example aspects, and are not intended to limit the scope of the present disclosure. The terms of a singular form may include plural forms unless the context clearly indicates otherwise.

The word "exemplary" is used to mean serving as an example or illustration, unless otherwise specified. Aspects are example aspects. In one or more implementations, "aspects," "examples," and the like should not be construed to be preferred or advantageous over other implementations. An aspect, an example, an example aspect, or the like may refer to one or more aspects, one or more examples, one or more example aspects, or the like, unless stated otherwise. Further, the term "may" encompass all the meanings of the term "may."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts may be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, may be used to describe a correlation between various elements (e. g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, may include all directions of "above" and "below." Likewise, an exemplary term "above" or "on" may include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like may be used herein to describe various elements (e.g., layers, films, regions, components, sections, members, parts, regions, areas, portions, steps, operations, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e. g., layer, film, region, component, section, or the like) is described as "connected," "coupled," "attached," "adhered," or the like to another element, the element may not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e. g., layer, film, region, component, section, or the like) "contacts," "overlaps," or the like with another element, the element may not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided," "disposed," "connected," "coupled," or the like in, on, with or to another element may be understood as that at least a portion of the element is provided, disposed, connected, coupled, or the like in, on, with or to at least a portion of another element, or that the entirety of the element is provided, disposed, connected, coupled, or the like in another element. The phrase that an element (e.g., layer, film, region, component, section, or the like) "contacts," "overlaps," or the like with another element may be understood, for example, as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms may mean a wider range of lines or directions within which the components of the present disclosure may operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure may operate functionally.

The term “at least one” should be understood as including any and all combinations of one or more of the associated listed items. For example, each of the phrases of “at least one of a first item, a second item, or a third item” and “at least one of a first item, a second item, and a third item”, may represent (i) a combination of items provided by one or more of the first item, the second item, and the third item or (ii) only one of the first item, the second item, and the third item.

The expression of a first element, a second elements, “and/or” a third element should be understood to encompass one of the first, second, and third elements, as well as any and all combinations of the first, second and third elements. By way of example, A, B and/or C encompass only A; only B; only C; any of A, B, and C (e. g., A, B, or C); some combinations of A, B, and C (e. g., A and B; A and C; or B and C); and all of A, B, and C. Furthermore, an expression “A/B” may be understood as A and/or B. For example, an expression “A/B” may refer to only A; only B; A or B; or A and B.

In one or more aspects, the terms “between” and “among” may be used interchangeably simply for convenience unless stated otherwise. For example, an expression “between a plurality of elements” may be understood as among a plurality of elements. In another example, an expression “among a plurality of elements” may be understood as between a plurality of elements. In one or more examples, the number of elements may be two. In one or more examples, the number of elements may be more than two. Furthermore, when an element (e.g., layer, film, region, component, sections, or the like) is referred to as being “between” at least two elements, the element may be the only element between the at least two elements, or one or more intervening elements may also be present.

In one or more aspects, the phrases “each other” and “one another” may be used interchangeably simply for convenience unless stated otherwise. For example, an expression “different from each other” may be understood as different from one another. In another example, an expression “different from one another” may be understood as different from each other. In one or more examples, the number of elements involved in the foregoing expression may be two. In one or more examples, the number of elements involved in the foregoing expression may be more than two.

In one or more aspects, the phrases “one or more among” and “one or more of” may be used interchangeably simply for convenience unless stated otherwise.

The term “or” means “inclusive or” rather than “exclusive or.” For example, unless otherwise stated or clear from the context, the expression that “x uses a or b” means any one of natural inclusive permutations. For example, “a or b” may mean “a,” “b,” or “a and b.” For example, “a, b or c” may mean “a,” “b,” “c,” “a and b,” “b and c,” “a and c,” or “a, b and c.”

Features of various aspects of the present disclosure may be partially or entirely coupled to or combined with each other, may be technically associated with each other, and may be operated, linked, or driven together in various ways. Aspects of the present disclosure may be implemented or carried out independently from each other, or may be implemented or carried out together in a co-dependent or related relationship. In one or more aspects, the components of each apparatus according to various aspects of the present disclosure may be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings.

In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

First Aspect

FIG. 1 illustrates a configuration of a sound apparatus 1 according to an aspect of the present disclosure. A driving signal (or a sound signal or a voice signal) input to the sound apparatus 1 will be described with reference to FIG. 1. The sound apparatus 1 may be individually used as a speaker, or may be embedded into an advertising signboard, a poster, a noticeboard, a vehicle, a building, or display apparatus or the like. The use of the sound apparatus 1 according to the aspect of the present disclosure is not particularly limited thereto.

The sound apparatus 1 may include a first vibration device 11 and a second vibration device 21. The first vibration device 11 and the second vibration device 21 may be a device which is displaced based on an inverse piezoelectric effect when a voltage is applied based on a driving signal input thereto. The first vibration device 11 and the second vibration device 21, for example, may be an element which is flexurally displaced based on a voltage such as bimorph, unimorph, or multimorph. An input driving signal may be an alternating current (AC) voltage generally, and thus, the first vibration device 11 and the second vibration device 21 may vibrate based on the input driving signal to generate a vibration and/or a sound. For example, the first vibration device 11 and the second vibration device 21 may be a vibration generating device, a sound generating device, a piezoelectric device, a vibration generator, a sound generator, a piezoelectric speaker, or a voice generating device, but aspects of the present disclosure are not limited thereto, A host system 7 may be a system including an apparatus or a plurality of apparatuses, which supply the driving signal to control the sound apparatus 1. However, the host system 7 may further supply other signals such as an image signal (for example, RGB data or RGBW data) and a timing signal (for example, a vertical synchronization signal, a horizontal synchronization signal, and a data enable signal, etc.) or the like based on the use of the sound apparatus 1. The host system 7 may be, for example, a source sound reproduction apparatus, a local broadcast apparatus, a radio broadcast reproduction system, a television (TV) system, a set-top box, a navigation system, an optical disk player, a computer, a home theater system, a video phone system, or the like. Further, the sound apparatus 1 and the host system 7 may be an integrated apparatus or separate apparatuses.

The host system 7 may include an input unit 701, a digital-to-analog (D/A) converter 711, a pulse width modulation (PWM) circuit 712, transistors 721 and 722, a coil 723, and a capacitor 724. The input unit 701 may input a digital signal to control the first vibration device 11 and the second vibration device 21. The D/A converter 711 may convert the digital signal input from the input unit 701 into an analog signal. The PWM circuit 712 may pulse-width-modulate the analog signal input from the D/A converter 711 to output a pulse signal. The transistors 721 and 722 may include a PNP type transistor 721 and an NPN type transistor 722. The PNP type transistor 721 and the NPN type transistor 722 may configure a push-pull circuit. For example, a collector terminal of each of the transistors 721 and 722 may be connected to each other, and a base terminal of each of the transistors 721 and 722 may be connected to each other. A positive voltage+Vdd may be applied to an emitter terminal of the transistor 721, and a negative voltage−Vdd may be applied to an emitter terminal of the transistor 722. The pulse signal from the PWM circuit 712 may be applied to the base terminals of the transistors 721 and 722, and the transistors 721 and 722 may be complementarily turned on or turned off based on the pulse signal. For example, when a positive pulse signal is applied to the base terminals of the transistors 721 and 722, the transistor 721 may be turned on and the transistor 722 may be turned off. Therefore, a voltage of the collector terminal of each of the transistors 721 and 722 may be a voltage+Vdd. On the other hand, when the negative pulse signal is applied to the base terminals of the transistors 721 and 722, the transistor 721 may be turned off and the transistor 722 may be turned on. Therefore, a voltage of the collector terminal of each of the transistors 721 and 722 may be a voltage−Vdd. In addition, when a potential of the pulse signal is a ground potential, the transistors 721 and 722 may be turned off simultaneously. The coil 723 and the capacitor 724 may each function as a low pass filter and may smooth the pulse signal at the collector terminal of each of the transistors 721 and 722 to output to the first vibration device 11 and the second vibration device 21 as a driving signal (or a sound signal or a voice signal).

Figure 2:
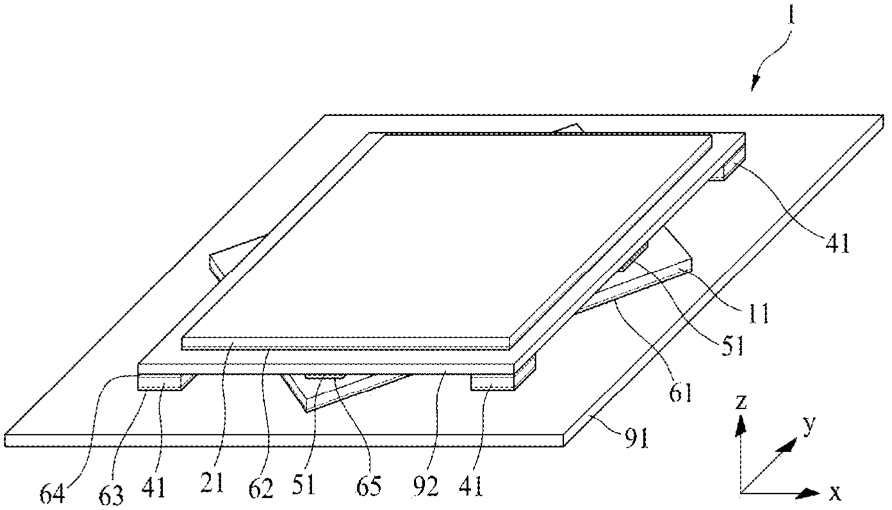
FIG. 2 is a perspective view illustrating a configuration of a sound apparatus according to a first aspect of the present disclosure.
Figure 3:
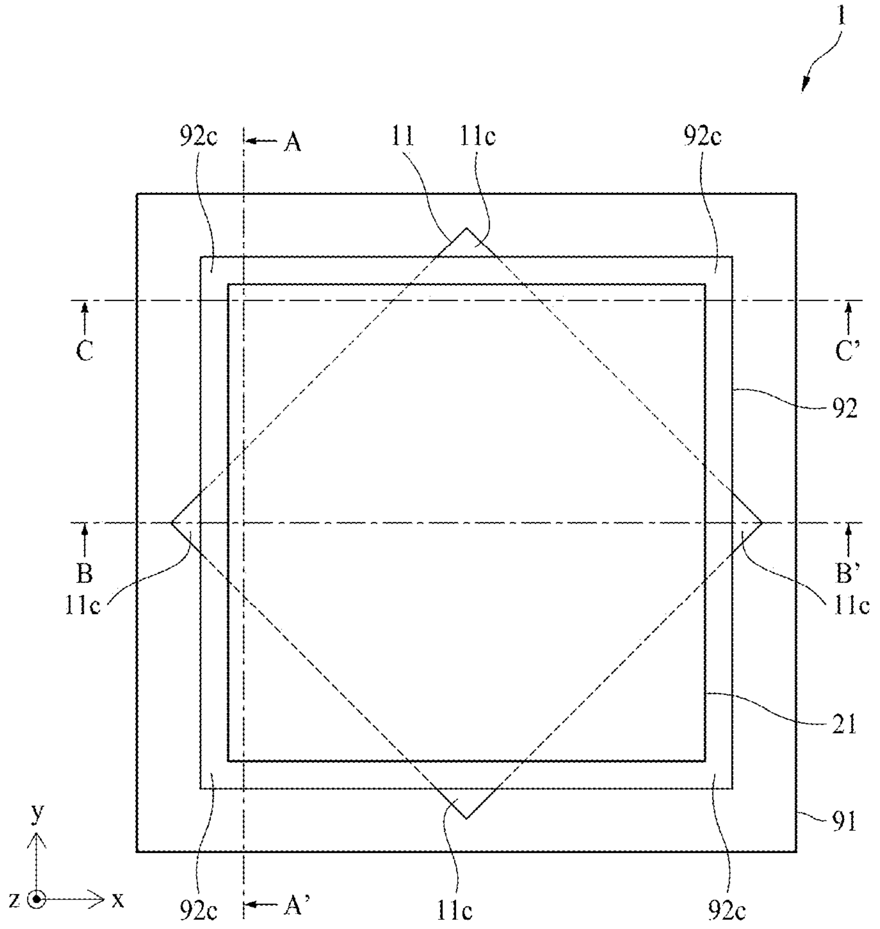
FIG. 3 is a plan view illustrating a configuration of a sound apparatus according to a first aspect of the present disclosure.
Figure 4:
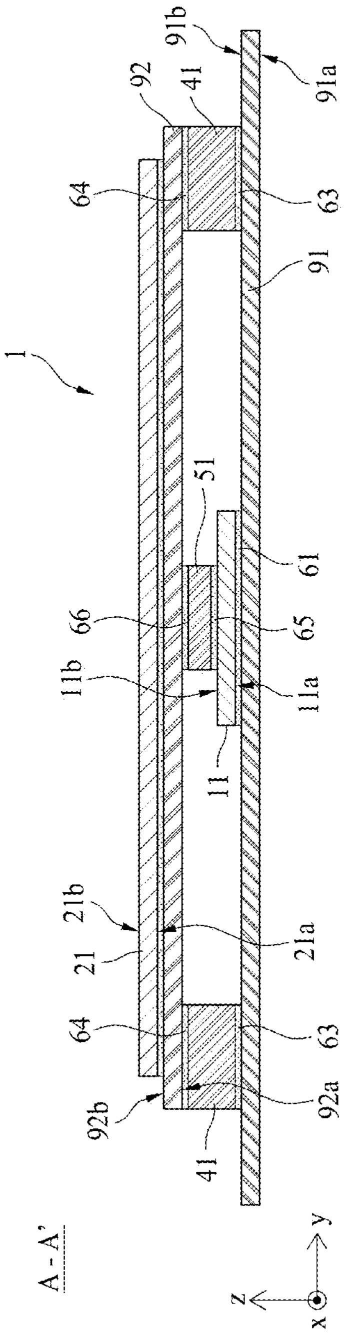
FIG. 4 is a cross-sectional view illustrating a configuration of a sound apparatus according to a first aspect of the present disclosure.
Figure 5:
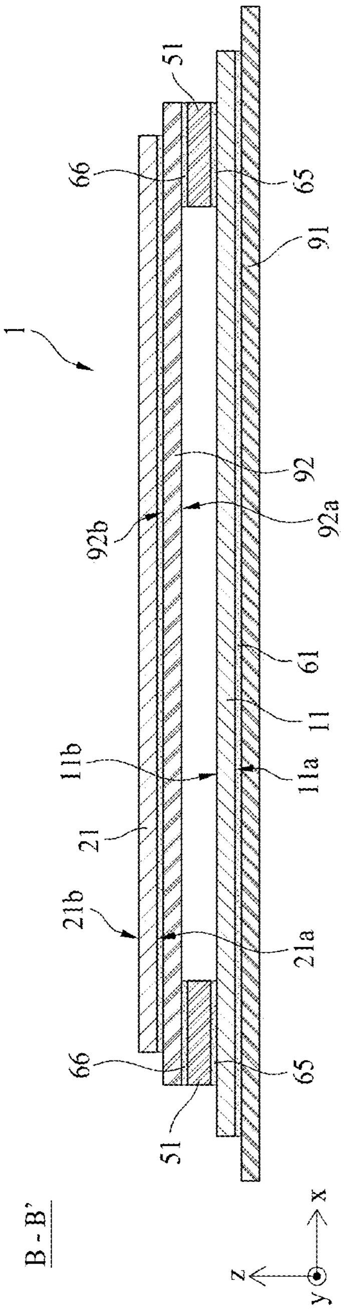
FIG. 5 is a cross-sectional view illustrating a configuration of a sound apparatus according to a first aspect of the present disclosure.
Figure 6:
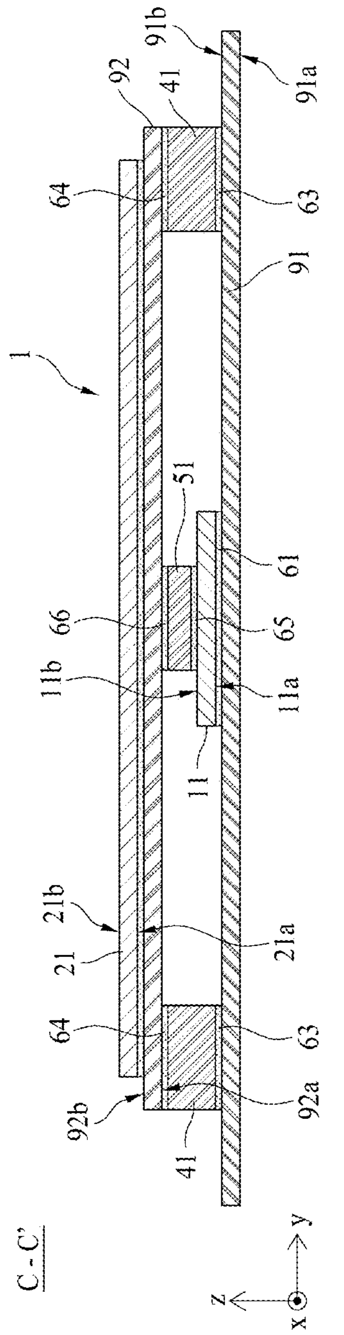
FIG. 6 is a cross-sectional view illustrating a configuration of a sound apparatus according to a first aspect of the present disclosure.
Figure 7:
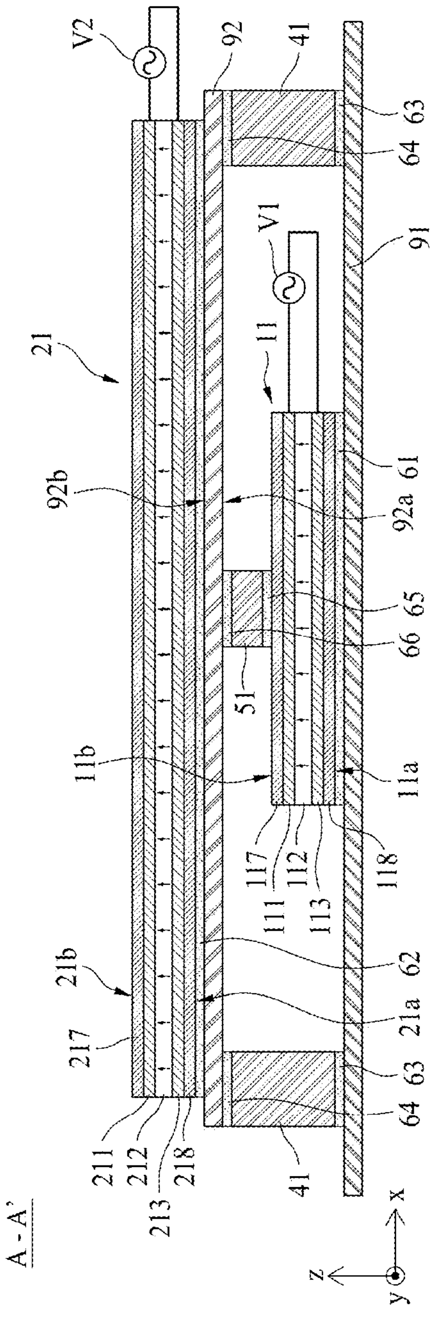
FIG. 7 is a cross-sectional view illustrating a structure of a sound apparatus according to a first aspect of the present disclosure in more detail.

FIG. 2 is a perspective view illustrating a configuration of a sound apparatus according to a first aspect of the present disclosure. FIG. 3 is a plan view illustrating a configuration of a sound apparatus according to a first aspect of the present disclosure. FIGS. 4 to 6 are a cross-sectional view illustrating a configuration of a sound apparatus according to a first aspect of the present disclosure. FIGS. 4 and 7 illustrate a cross-sectional view taken along line A-A' of FIG. 3 according to a first aspect of the present disclosure. FIG. 5 illustrates a cross-sectional view taken along line B-B' of FIG. 3 according to a first aspect of the present disclosure. FIG. 6 illustrates a cross-sectional view taken along line C-C' of FIG. 3 according to a first aspect of the present disclosure. A detailed configuration of a sound apparatus 1 according to a first aspect of the present disclosure will be described with cross-reference to FIGS. 2 to 7.

As illustrated in FIG. 2, the sound apparatus 1 may include a first vibration device 11, a second vibration device 21, elastic members 41 and 51, a first vibration member 91, and a second vibration member 92.

As illustrated in FIGS. 2 and 3, the first vibration device 11, the second vibration device 21, the first vibration member 91, and the second vibration member 92 may have a plate shape having a rectangular shape or an approximately square shape in a plane. For example, an outer periphery (or an outer edge) of each of the first vibration device 11, the second vibration device 21, the first vibration member 91, and the second vibration member 92 may have a plate shape having a rectangular shape or an approximately square shape in a plane.

As illustrated in FIG. 3, the first vibration device 11 may include four corner portions (or edge portions) 11*c*. Moreover, the second vibration member 92 may include four corner portions (or edge portions) 92*c*. The first vibration device 11 and the second vibration device 21 may have a same shape in a plane. Further, each of the first vibration device 11 and the second vibration device 21 may include one or a plurality of piezoelectric devices. For example, each of the first vibration device 11 and the second vibration device 21 may include one or more piezoelectric devices.

In FIGS. 2 to 7, a coordinate-axis is illustrated where a direction parallel to line B-B' and line C-C' may be an x-axis, a direction parallel to line A-A' may be a y-axis, and a direction perpendicular to the x-axis and the y-axis is the z-axis. A direction parallel to the x-axis may be referred to as a first direction, and a direction parallel to the y-axis may be referred to as a second direction.

In an aspect of the present disclosure, the first direction and the second direction may be perpendicular to each other in a plane. The first vibration device 11 may include two main surfaces opposite to each other. For example, a surface of the two main surfaces of the first vibration device 11 in an opposite direction side (or negative direction side or rearward direction side) of the z-axis may be referred as a first main surface 11*a*, and a surface of the two main surfaces of the first vibration device 11 in a forward direction side (or positive direction side) of the z-axis may be referred as a second main surface 11*b*. Each corner portion (or edge portion) of the first vibration device 11 may include a portion of a first main surface 11*a* and a portion of a second main surface 11*b*. Likewise, each of the first vibration device 11 and the second vibration member 92 may each include two main surfaces opposite to each other. A surface of the two main surfaces of the second vibration device 21 in an opposite direction side of the z-axis may be referred as a first main surface 21*a*, and a surface of the two main surfaces of the second vibration device 21 in the forward direction side of the z-axis may be referred as a second main surface 21*b*. Further, a surface of the two main surfaces of the second vibration member 92 in an opposite direction side of the z-axis may be referred as a first main surface 92*a*, and a surface of the two main surfaces of the second vibration member 92 in the forward direction side of the z-axis may be referred as a second main surface 92*b*. Each corner portion (or edge portion) 92*c* of the second vibration member 92 may include a portion of a first main surface 92*a* and a portion of a second main surface 92*b*.

The first vibration device 11 may be disposed on a main surface of the first vibration member 91. In detail, as illustrated in FIGS. 4 to 6, a front surface of the first main surface 11*a* of the first vibration device 11 may be connected to (or contact) the first vibration member 91. For example, the first vibration device 11 and the first vibration member 91 may be connected to (or contact) each other through (or by) an adhesive member (or an adhesive layer or an adhesive or a first adhesive member) 61. Because the front surface of the first main surface 11*a* of the first vibration device 11 is connected to (or contact) the first vibration member 91, the stiffness of the first vibration device 11 may increase, and a crack of the first vibration device 11 may be prevented from occurring when a high sound pressure level is input. A vibration generated from the first vibration device 11 by an input driving signal (or voice signal or sound signal) may be transferred to the first vibration member 91 directly (or through (or by) the adhesive member 61).

The second vibration member 92 may be disposed on the first vibration device 11. The second vibration member 92 may overlap the first vibration member 91 and may have a size which is smaller than that of the first vibration member 91. The first vibration device 11 may be between the first vibration member 91 and the second vibration member 92 and may be connected to the first vibration member 91. The second vibration member 92 may be configured to be connected to the first vibration device 11 and the first vibration member 91. In detail, as illustrated in FIGS. 2 and 4 to 6, four elastic members 51 may be disposed at the corner portion (or edge portion) 11*c* of the first vibration device 11 and may be connected to (or contact) the second main surface 11*b* of the first vibration device 11. Moreover, the elastic member 51 may be connected to (or contact) a portion of the first main surface 92*a* of the second vibration member 92. For example, the second vibration member 92 may be connected to (or contact) the first vibration device 11 through (or by) the elastic member 51. Furthermore, the second vibration member 92 may not directly contact the first vibration device 11. For example, the first main surface 92*a* of the second vibration member 92 may be spaced apart from the second main surface 11*b* of the first vibration device 11 by a certain (or a pre-defined) distance and may be disposed to be opposite thereto. A certain (or a pre-defined) distance between the first main surface 92*a* of the second vibration member 92 and the second main surface 11*b* of the first vibration device 11 may correspond to a thickness of the elastic member 51 (a height of the elastic member 51 in a z-axis direction).

The second vibration device 21 may be disposed on the second main surface 92*b* of the second vibration member 92. In detail, a front surface of the first main surface 21*a* of the second vibration device 21 may be connected to (or contact) the second main surface 92*b* of the second vibration member 92. For example, the second vibration device 21 and the second vibration member 92 may be connected to (or contact) each other through (or by) an adhesive member (or an adhesive layer or an adhesive or a second adhesive member) 62. Because the front surface of the first main surface 21*a* of the second vibration device 21 is connected to (or contact) the second vibration member 92, the stiffness of the second vibration device 21 may increase, and a crack of the second vibration device 21 may be prevented from occurring when a high sound pressure level is input. A vibration generated from the second vibration device 21 by an input driving signal (or voice signal or sound signal) may be transferred to the second vibration member 92 directly (or through (or by) the adhesive member 62).

As illustrated in FIGS. 2, 4, and 6, four elastic members 41 may be disposed at the corner portion (or edge portion) 92*c* of the second vibration member 92 and may be connected to (or contact) the first main surface 92*a* of the second vibration member 92. Further, the elastic member 41 may be connected to (or contact) a portion of the main surface of the first vibration member 91. For example, the second vibration member 92 may be connected to the first vibration member 91 through (or by) the elastic member 41.

Furthermore, in the cross-sectional view of FIG. 4, an end surface (or a distal end surface) of the elastic member 41 facing a second direction may be aligned with an end surface (or a distal end surface) of the second vibration member 92 facing the second direction. Likewise, in the cross-sectional view of FIGS. 5 and 6, an end surface (or a distal end surface) of the elastic members 41 and 51 facing a first direction may be aligned with an end surface (or a distal end surface) of the second vibration member 92 facing the first direction. However, the elastic members 41 and 51 may not be disposed at a position illustrated in FIGS. 4 to 6. For example, the elastic members 41 and 51 may be disposed so that corresponding end surfaces of the elastic members 41 and 51 are disposed more outward than a corresponding end surface (or distal end surface) of the second vibration member 92. Alternatively, the elastic members 41 and 51 may be disposed so that corresponding end surfaces of the elastic members 41 and 51 are disposed more inward than a corresponding end surface (or distal end surface) of the second vibration member 92. For example, the four elastic members 41 may be disposed (or interposed) between a corner portion (or an edge portion) 92*c* of the first main surface 92*a* of the second vibration member 92 and a main surface of the first vibration member 91. For example, each of the four elastic members 51 may be disposed between two adjacent elastic members 41 of the four elastic members 41. For example, each of the four elastic members 51 may be disposed or connected between the first main surface 92*a* of the second vibration member 92 and the second main surface 11*b* of the first vibration device 11, between two adjacent elastic members 41 of the four elastic members 41.

Furthermore, as illustrated in FIGS. 3 and 4, the second vibration device 21, the first vibration member 91, and the second vibration member 92 may be disposed so that a pair of sides facing each other are parallel to the first direction in a plane, and a pair of sides opposite to each other are parallel to the second direction in a plane. Meanwhile, the first vibration device 11 may be disposed in a 45-degree rotation direction about an axis (or a z-axis) perpendicular to the first main surface 21*a* and the second main surface 21*b* of the second vibration device 21 with respect to the second vibration device 21 in a plane. For example, the first vibration device 11 may be disposed so that two diagonal lines of the second main surface 11*b* are respectively parallel to the first direction and the second direction in a plane.

Moreover, in a plane, the corner portion (or edge portion) 11*c* of the first vibration device 11 may include a portion which does not overlap the second vibration device 21 and the second vibration member 92. For example, the corner portion (or edge portion) 11*c* of the first vibration device 11 may protrude to an outer side of the second vibration device 21 and the second vibration member 92. For example, in a plane, the second main surface 11*b* of the first vibration device 11 may include a portion which does not overlap the second main surface 21*b* of the second vibration device 21 and the second main surface 92*b* of the second vibration member 92.

Furthermore, a portion, except the corner portion (or edge portion) 11$c$, of the first vibration device 11 may overlap a portion of the second vibration member 92 in a plane. For example, in a plane, a portion, except the corner portion (or edge portion) 11$c$, of the second main surface 11$b$ may overlap a portion of the second vibration member 92. Further, at least a portion, except the corner portion (or edge portion) 11$c$, of the first vibration device 11 may overlap a portion of the second vibration device 21 in a plane. For example, in a plane, at least a portion, except the corner portion (or edge portion) 11$c$, of the second main surface 11$b$ may overlap a portion of the second main surface 21$b$ of the second vibration device 21. For example, a rotation angle of the first vibration device 11 with respect to the second vibration device 21 according to another aspect of the present disclosure is not limited to 45 degrees and may be adjusted to a certain (or a pre-defined) angle other than 45 degrees.

The elastic member 41 may be connected to the first vibration member 91 and the second vibration member 92 through (or by) adhesive members (or adhesive or adhesive layer) 63 and 64. Further, the elastic member 51 may be connected to the first vibration device 11 and the second vibration member 92 through (or by) adhesive members (or adhesive or adhesive layer) 65 and 66. For example, the elastic member 41 may be connected to the first vibration member 91 through (or by) the adhesive member (or a third adhesive member) 63 and may be connected to the second vibration member 92 through (or by) the adhesive member (or a fourth adhesive member) 64. For example, the elastic member 51 may be connected to the second main surface 11$b$ of the first vibration device 11 through (or by) the adhesive member (or a fifth adhesive member) 65 and may be connected to the first main surface 92$a$ of the second vibration member 92 through (or by) the adhesive member (or a sixth adhesive member) 66. For example, the elastic member 41 may be a first elastic member, a first connection member, or a first coupling member, and the elastic member 51 may be a connection member, a coupling member, a second elastic member, or a second connection member, or a second coupling member, but aspects of the present disclosure are not limited thereto.

The elastic member 41 and the elastic member 51 may be configured by using, for example, a material such as resin or the like. An example of resin that may be configured as the elastic member 41 and the elastic member 51 may be used polyurethane or polyethylene terephthalate (PET), but aspects of the present disclosure are not limited thereto. At least a portion of the elastic member 41 and the elastic member 51 may have a hexahedral shape, but aspects of the present disclosure are not limited thereto. For example, the elastic member 41 and the elastic member 51 may have a rectangular shape in a plane and a cross-sectional view. Further, at least a portion of the elastic member 41 and the elastic member 51 may have a circular pillar (or cylindrical) shape or an oval pillar (or elliptic cylinder) shape. For example, the elastic member 41 and the elastic member 51 may be circular or oval (or ellipse) in a plane, or may have a rectangular shape in a cross-sectional view. The elastic member 41 and the elastic member 51 may be a transfer member or a vibration transfer member which transfers a vibration, generated by the second vibration device 21, to the vibration member 90, based on a driving signal input thereto. Further, the elastic member 51 may be a transfer member or a vibration transfer member which transfers a vibration, generated by the second vibration device 21, to the vibration member 90 through (or by) the first vibration device 11, based on a driving signal input thereto.

According to an aspect of the present disclosure, one or more of the adhesive members 61 to 66 may include an elasticity material which has adhesiveness and is capable of compression and decompression. For example, the adhesive members 61 to 66 may include an adhesive material having elasticity or flexibility. For example, the adhesive members 61 to 66 may include an adhesive material which is low in elastic modulus (or Young's modulus). For example, the adhesive members 61 to 66 may be configured in an adhesive resin, an adhesive, an adhesive tape, or an adhesive pad, or the like, but aspects of the present disclosure are not limited thereto. For example, the adhesive tape may include a double-sided tape, a double-sided foam tape, a double-sided sponge tape, which have adhesive layers, or the like, but aspects of the present disclosure are not limited thereto. The adhesive pad may have an adhesive layer and may an elastic pad such as a silicone pad or a rubber pad capable of compression and decompression.

The adhesive resin, the adhesive, or the adhesive layer of each of the adhesive members 61 to 66 according to another aspect of the present disclosure may include epoxy-based, acrylic-based, silicone-based, or urethane-based, but aspects of the present disclosure are not limited thereto. For example, the adhesive members 61 to 66 may include an acrylic-based material which is relatively better in adhesive force and hardness than the urethane so that the vibration of the vibration devices 11 and 21 may be transferred to the vibration members 91 and 92 well, but aspects of the present disclosure are not limited thereto.

The adhesive resin, the adhesive, or the adhesive layer of each of the adhesive members 61 to 66 according to an aspect of the present disclosure may be a photo-curable adhesive material, but aspects of the present disclosure are not limited thereto. For example, the adhesive resin, the adhesive, or the adhesive layer may be an ultraviolet (UV) adhesive, but aspects of the present disclosure are not limited thereto.

The first vibration member 91 and the second vibration member 92 may be a passive vibration plate, a vibration plate, or a vibration substrate. The first vibration member 91 and the second vibration member 92 may have a flat plate shape (or a plate shape). The first vibration member 91 and the second vibration member 92 may be configured in a material such as metal, resin, glass, hard paper, wood, rubber, plastic, fiber, cloth, paper, leather, or carbon or the like, but aspects of the present disclosure are not limited thereto. Metal configuring the first vibration member 91 and the second vibration member 92 may use stainless steel (SUS), but aspects of the present disclosure are not limited thereto. For example, when the first vibration member 91 and the second vibration member 92 use a material including stainless steel, the stiffness (or rigidity) of the first vibration device 11 and the second vibration device 21 may increase, and the occurrence of a crack may be prevented. When an applied voltage increases by a certain level or more for increasing a sound pressure level output from the sound apparatus 1, a crack may be propagated to a vibration device by an increase in curvature of each of the first vibration device 11 and the second vibration device 21. Sound performance may be considerably reduced by a crack occurring in a vibration device. According to an aspect of the present disclosure, even when a high sound pressure level is needed based on an input of a large signal (or a high voltage), a sound apparatus may be provided where the occurrence of a crack is prevented and sound quality is enhanced.

According to another aspect of the present disclosure, the first vibration member 91 may include a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window (or a vehicular window), a vehicular exterior material, a vehicular seat interior material, a vehicular ceiling material, a building ceiling material, a building interior material, a building glass window, an aircraft interior material, an aircraft glass window, or a mirror, but aspects of the present disclosure are not limited thereto.

The aspect of the structure of the sound apparatus 1 will be described in more detail with reference to FIG. 7. FIG. 7 is an enlarged view of illustrating the first vibration device 11 and the second vibration device 21 at a same section as that of FIG. 6. Moreover, in FIG. 7, a connection relationship of each electrode included in the first vibration device 11 and the second vibration device 21 schematically illustrates by a circuit diagram to describe a method for inputting a driving signal to the sound apparatus 1.

The first vibration device 11 may include an electrode (or a first electrode) 111, a vibration layer (or a piezoelectric layer) 112, and an electrode (or a second electrode) 113. The electrode 111 and the electrode 113 may be disposed with the vibration layer 112 therebetween in a thickness direction. A voltage V1 may be applied to the vibration layer 112 through (or by) the electrode 111 and the electrode 113. The voltage V1 may correspond to a driving signal (or a voice signal or a sound signal).

The first vibration device 11 may further include a protection layer (or a protection member) 117. The protection layer 117 may be configured to protect and/or insulate an upper surface of the electrode 111. The first vibration device 11 may further include a second protection layer (or a second protection member) 118. The second protection layer 118 may be configured to protect and/or insulate a lower surface of the electrode 113. For example, one or more of the protection layer 117 and the second protection layer 118 may be omitted. For example, the protection layers 117 and 118 may be a polyimide film, a polyethylene terephthalate film, or polyethylene naphthalate film, but aspects of the present disclosure are not limited thereto. In an aspect of the present disclosure, a polarization direction (or a poling direction) of the vibration layer 112 may be a forward direction (or a positive direction) or an opposite direction (or a negative direction) of the z-axis, as illustrated in FIG. 7. Further, wires (or lines) configured to apply a voltage to each electrode may be connected to (or contact) the electrodes 111 and 113 by soldering or the like.

The first vibration device 11 may be connected to the first vibration member 91 by an adhesive member (or a first adhesive member) 61. The adhesive member 61 may be configured to connect the first vibration device 11 to a main surface of the first vibration member 91. For example, the first vibration device 11 may be connected to the main surface of the first vibration member 91 by an entire surface attachment scheme by the adhesive member 61.

The second vibration device 21 may include an electrode (or a first electrode) 211, a vibration layer (or a piezoelectric layer) 212, and an electrode (or a second electrode) 213. The electrode 211 and the electrode 213 may be disposed with the vibration layer 212 therebetween in a thickness direction. A voltage V2 may be applied to the vibration layer 212 through (or by) the electrode 211 and the electrode 213. The voltage V2 may correspond to a driving signal (or a voice signal or a sound signal). The voltage V2 may have a same phase as the voltage V1 applied to the first vibration device 11, and may have a phase which is opposite to a phase of the voltage V1.

The second vibration device 21 may further include a protection layer (or a first protection member) 217. The protection layer 217 may be configured to protect and/or insulate an upper surface of the electrode 211. The second vibration device 21 may further include a second protection layer (or a second protection member) 218. The second protection layer 218 may be configured to protect and/or insulate a lower surface of the electrode 213. For example, one or more of the protection layer 217 and the second protection layer 218 may be omitted. For example, the protection layers 217 and 218 may be a polyimide film, a polyethylene terephthalate film, or polyethylene naphthalate film, but aspects of the present disclosure are not limited thereto.

The second vibration device 21 may be connected to the second vibration member 92 by an adhesive member (or a second adhesive member) 62. The adhesive member 62 may be configured to connect the second vibration device 21 to a main surface 92*b* of the second vibration member 92. For example, the second vibration device 21 may be connected to the main surface 92*b* of the second vibration member 92 by an entire surface attachment scheme by the adhesive member 62. For example, phases of an input voltage V1 and an input voltage V2 may be appropriately changed based on an elastic modulus (or Young's modulus) of each of the elastic member 41, the elastic member 51, and the second vibration member 92, which are used in the sound apparatus 1. In an aspect of the present disclosure, a polarization direction (or a poling direction) of the vibration layer 112 may be a forward direction (or a positive direction) or an opposite direction (or a negative direction) of the z-axis, as illustrated in FIG. 7. Wires (or lines) configured to apply a voltage to each electrode may be connected to (or contact) the electrodes 111 and 113 by soldering or the like.

A voltage applied to each of the first vibration device 11 and the second vibration device 21 may be based on a voice signal, and thus, may be an alternating current (AC) voltage based on a frequency of a voice which should be generated. In FIG. 7, an AC voltage supplied to the first vibration device 11 may be V1, and an AC voltage supplied to the second vibration device 21 may be V2. One terminal of an AC power source may be connected to (or contact) the electrode 111 and the electrode 211, and the other terminal of the AC power source may be connected to (or contact) the electrode 113 and the electrode 213. Moreover, in FIG. 7, two AC power sources are illustrated, but one AC power source may be used. For example, when the voltage V2 has a same phase as that of the voltage V1 applied to the first vibration device 11, a driving signal may be supplied from one (common) AC power source to the first vibration device 11 and the second vibration device 21. For example, one terminal of the one (common) AC power source may be connected to (or contact) the electrode 111 and the electrode 211, and the other terminal of the one (common) AC power source may be connected to (or contact) the electrode 113 and the electrode 213. Further, when the voltage V2 has a phase which is opposite to that of the voltage V1 applied to the first vibration device 11, a driving signal may be supplied from the one (common) AC power source to the first vibration device 11 and the second vibration device 21. For example, one terminal of the one (common) AC power source may be connected to (or contact) the electrode 111 and the electrode 213, and the other terminal of the one (common) AC power source may be connected to (or contact) the electrode 113 and the electrode 211.

When an AC voltage is applied between the electrode 111 and the electrode 113 of the first vibration device 11, the vibration layer 112 may contract and expand, and a periodic stress may be applied to the first vibration member 91. For example, the first vibration device 11 may transfer a periodic stress to the first vibration member 91, and the first vibration member 91 may flexurally vibrate based on the transferred stress. A vibration (for example, a sound) based on a voice signal may be generated by a vibration of the first vibration member 91 based on the transferred stress. Likewise, when an AC voltage is applied between the electrode 211 and the electrode 213 of the second vibration device 21, the vibration layer 212 may contract and expand, and a periodic stress may be applied to the first vibration member 91 through (or by) the elastic member 41, the elastic member 51, and the first vibration device 11. The first vibration member 91 may flexurally vibrate based on the transferred stress, and a vibration and/or a sound based on a voice signal may be generated.

Material of the vibration layer 112 and the vibration layer 222 is not particularly limited thereto, but may include ferroelectric ceramic, having good piezoelectric properties, such as lead zirconate titanate (PZT)-based materials or the like to increase the amount of displacement. As another example, material used as material of the vibration layer 112 and the vibration layer 222 may include a piezoelectric material of a ceramic-based material capable of implementing a relatively strong vibration. As another example, the vibration layer 112 and the vibration layer 222 may include a piezoelectric ceramic material having a perovskite-based crystal structure. Moreover, the vibration layer 112 and the vibration layer 222 may have a polycrystalline structure or a single-crystalline structure. For example, the vibration layer 112 and the vibration layer 222 may be configured as the polycrystalline ceramic or the single-crystalline ceramic. Further, the vibration layer 112 and the vibration layer 222 may be configured as a PVDF (Polyvinylidene fluoride)-based material or material including a piezoelectric material including lead (Pb), or may be configured as a piezoelectric material without lead (Pb). For example, the piezoelectric material including lead (Pb) may include one or more of a lead zirconate titanate (PZT)-based material, a lead zirconate nickel niobate (PZNN)-based material, a lead magnesium niobate (PMN)-based material, a lead nickel niobate (PNN)-based material, a lead zirconate niobate (PZN)-based material, or a lead indium niobate (PIN)-based material, but aspects of the present disclosure are not limited thereto. For example, the piezoelectric material without lead (Pb) may include one or more of barium titanate ($BaTiO_3$), calcium titanate ($CaTiO_3$), and strontium titanate ($SrTiO_3$), but aspects of the present disclosure are not limited thereto.

The adhesive layer 61 and the adhesive layer 62 may be configured as a compressed resin material, an adhesive, or an adhesive tape or the like, but aspects of the present disclosure are not limited thereto. Moreover, an elastic modulus of the adhesive member 61 may be equal to or different from an elastic modulus of the adhesive member 62. For example, the adhesive member 61 may have an elastic modulus which is smaller than that of the adhesive member 62. Further, a lateral surface of each of the first vibration device 11 and the second vibration device 21, and the third vibration device 31 may be covered by an insulator such as resin or the like to prevent an electrical short circuit between the vibration devices and the other members.

Material of the first electrodes 111 and 211 and the second electrodes 113 and 213 of each of the first vibration device 11 and the second vibration device 21 may include a transparent conductive material, a semitransparent conductive material, or an opaque conductive material. For example, as the transparent or semitransparent conductive material, the first electrode and the second electrode may include one or more of indium tin oxide (ITO) or indium zinc oxide (IZO), but aspects of the present disclosure are not limited thereto. As the opaque conductive material, the first electrode and the second electrode may include one of an aluminum (Al), a copper (Cu), a gold (Au), a silver (Ag), a molybdenum (Mo), and a magnesium (Mg), or an alloy thereof, but aspects of the present disclosure are not limited thereto.

Figure 8:
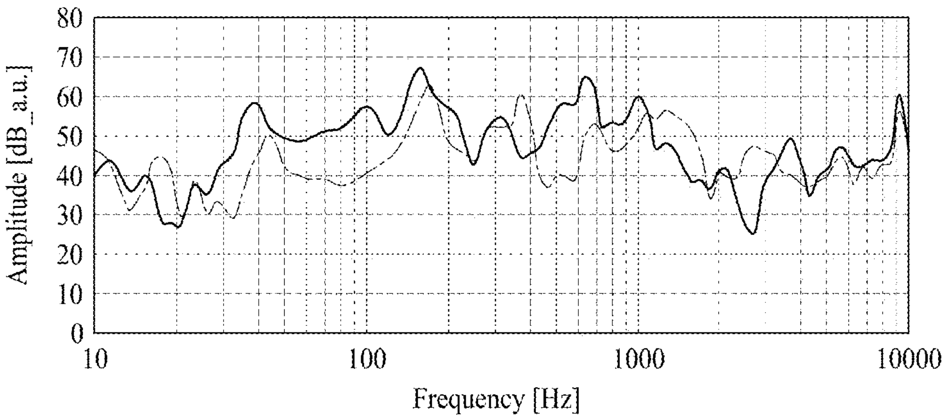
FIG. 8 is a graph illustrating a sound characteristic of the sound apparatus according to a first aspect of the present disclosure.
Figure 9:
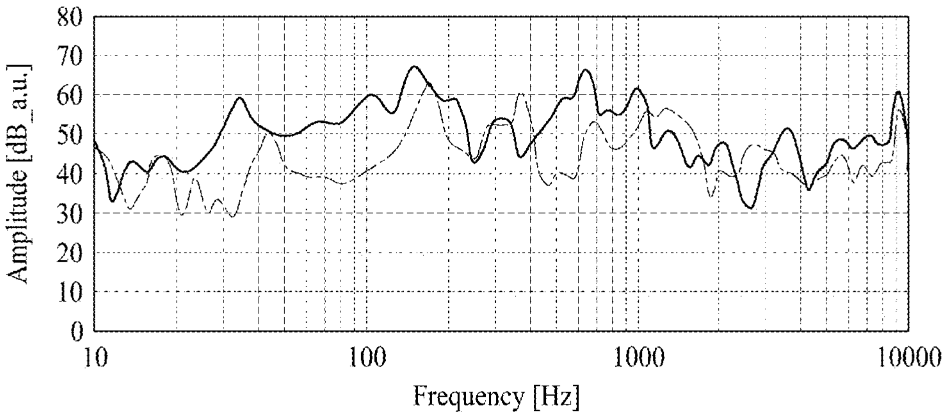
FIG. 9 is a graph illustrating a sound characteristic of the sound apparatus according to a first aspect of the present disclosure.

The enhancement of sound quality of the sound apparatus 1 according to an aspect of the present disclosure may be described with reference to real measurement data. FIGS. 8 and 9 are a graph illustrating a sound characteristic of the sound apparatus according to an aspect of the present disclosure. In FIGS. 8 and 9, the abscissa-axis represents a frequency (Hz) based on a log scale, and the ordinate-axis represents an amplitude (or a sound pressure level) based on a decibel (dB) unit. In FIG. 8, a curve illustrated by a solid line represents a sound characteristic of the sound apparatus 1 according to an aspect of the present disclosure when a phase of a driving signal (or voice signal or sound signal) applied to the first vibration device 11 is set to be equal to that of a driving signal applied to the second vibration device 21. In FIG. 9, a curve illustrated by a solid line represents a sound characteristic of the sound apparatus 1 according to an aspect of the present disclosure when a phase of a driving signal (or voice signal or sound signal) applied to the first vibration device 11 is set to be opposite to that of a driving signal applied to the second vibration device 21. In the present measurement, stainless steel having a thickness of 0.3 mm has been used as the first vibration member 91 and the second vibration member 92, and in FIGS. 8 and 9, a curve illustrated by a dash-single dotted line represents a sound characteristic of a sound apparatus (hereinafter referred to as an experimental example) when two vibration devices are stacked as a type which differs from the aspect of the present disclosure.

The sound apparatus 1 according to an aspect of the present disclosure and an experimental example may be compared with each other with reference to FIG. 8. The sound apparatus 1 according to an aspect of the present disclosure may have a sound pressure level which is higher than the experimental example, in almost full-range band of about 25 Hz to about 1,000 Hz. Comparing with the experimental example, the sound apparatus 1 according to an aspect of the present disclosure may have a relatively flat sound characteristic in a broad frequency band. Furthermore, in the present experiment, a crack has not occurred in the first vibration device 11 and the second vibration device 21 of the sound apparatus 1. For example, even when driving signals having a same phase are input to the first vibration device 11 and the second vibration device 21, the sound apparatus 1 according to the first aspect of the present disclosure may prevent the occurrence of a crack and may generate a high sound pressure level in a low-middle-pitched sound band. Accordingly, according to the first aspect of the present disclosure, the sound quality of a sound apparatus may be further enhanced.

Next, the sound apparatus 1 according to an aspect of the present disclosure and an experimental example may be compared with each other with reference to FIG. 9. The sound apparatus 1 according to an aspect of the present disclosure may have a sound pressure level which is higher than the experimental example, in almost full-range band of about 20 Hz to about 1,000 Hz. Comparing with the experimental example, the sound apparatus 1 according to an aspect of the present disclosure may have a relatively flat sound characteristic in a broad frequency band. Moreover, in the present experiment, a crack has not occurred in the first vibration device 11 and the second vibration device 21 of the sound apparatus 1. For example, even when a driving signal having a phase opposite to the second vibration device 21 is input to the first vibration device 11, the sound apparatus 1 according to the first aspect of the present disclosure may prevent the occurrence of a crack and may generate a high sound pressure level in a low-middle-pitched sound band. Accordingly, according to the first aspect of the present disclosure, the sound quality of a sound apparatus may be further enhanced.

Second Aspect

In the following description, the sound apparatus 1 according to the second aspect of the present disclosure will be described. A configuration of a first vibration device 11, a second vibration device 21, an elastic member 41, an elastic member 51, a first vibration member 91, and a second vibration member 92 are substantially a same as the first aspect of the present disclosure, and thus, its descriptions may be omitted. Moreover, a perspective view and a plan view of the sound apparatus 1 according to the second aspect of the present disclosure may be a same as FIGS. 2 and 3. Therefore, the sound apparatus 1 according to the second aspect of the present disclosure may be described with reference to FIGS. 2 and 3.

Figure 10:
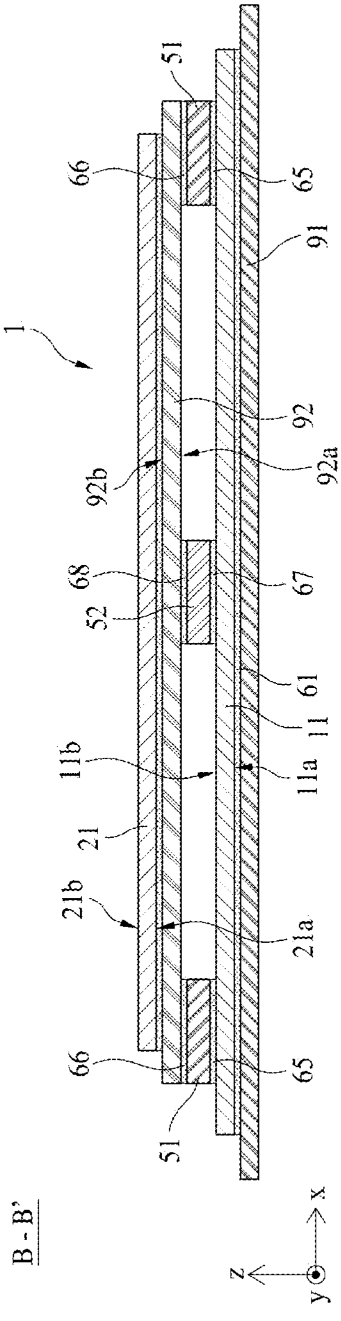
FIG. 10 is a cross-sectional view illustrating a configuration of a sound apparatus according to a second aspect of the present disclosure.

FIG. 10 is a perspective view illustrating a configuration of a sound apparatus 1 according to a second aspect of the present disclosure. FIG. 10 is a cross-sectional view taken along line B-B' illustrated in FIG. 3 according to the second aspect of the present disclosure.

As illustrated in FIG. 10, the sound apparatus 1 according to the second aspect of the present disclosure may further include the elastic member 52, and thus, may differ from the sound apparatus 1 according to the first aspect of the present aspect. For example, the sound apparatus 1 according to the second aspect of the present disclosure a first vibration device 11, a second vibration device 21, an elastic member 41, an elastic member 51, an elastic member 52, a first vibration member 91, and a second vibration member 92

As illustrated in FIG. 10, the elastic member 52 may be disposed on a second main surface 11*b* of the first vibration device 11. The elastic member 52 may be disposed between the first vibration device 11 and the second vibration member 92. For example, the elastic member 52 may be disposed between a center region of the first vibration device 11 and a center region of the second vibration member 92. In detail, the elastic member 52 may be disposed in the center region including a point (or a geometric center) at which two diagonal lines of the second main surface 11*b* of the first vibration device 11 intersect with each other in a plane. Further, the elastic member 52 may be connected to (or contact) a portion of the first main surface 92*a* of the second vibration member 92. In detail, the elastic member 52 may be connected to the center region including a point (or a geometric center) at which two diagonal lines of the first main surface 92*a* of the second vibration member 92 intersect with each other in a plane. For example, the second vibration member 92 may be connected to the first vibration device 11 through (or by) the elastic member 41 and the elastic member 52.

The second vibration member 92 may not directly contact the first vibration device 11. For example, the first main surface 92*a* of the second vibration member 92 may be spaced apart from the second main surface 11*b* of the first vibration device 11 by a certain (or a pre-defined) distance and may be disposed to be opposite thereto. A certain (or a pre-defined) distance between the first main surface 92*a* of the second vibration member 92 and the second main surface 11*b* of the first vibration device 11 may correspond to a thickness of the elastic member 52 (a height of the elastic member 52 in a z-axis direction). For example, the elastic member 52 may be connected to the second main surface 11*b* of the first vibration device 11 through (or by) an adhesive member (or a seventh adhesive member) 67 and may be connected to the first main surface 92*a* of the second vibration member 92 through (or by) an adhesive member (or an eighth adhesive member) 68. For example, the elastic member 52 may be a third elastic member, a third connection member, or a third coupling member. According to the second aspect of the present disclosure, like the sound apparatus 1 according to the first aspect of the present disclosure, a sound apparatus 1 which prevents the occurrence of a crack and generates a high sound pressure level in a low-middle-pitched sound band may be provided.

Third Aspect

In the following description, the sound apparatus 1 according to the third aspect of the present disclosure will be described. A configuration of an elastic member 41, an elastic member 51, and a first vibration member 91 are substantially a same as the first aspect of the present disclosure, and thus, its descriptions may be omitted.

Figure 11:
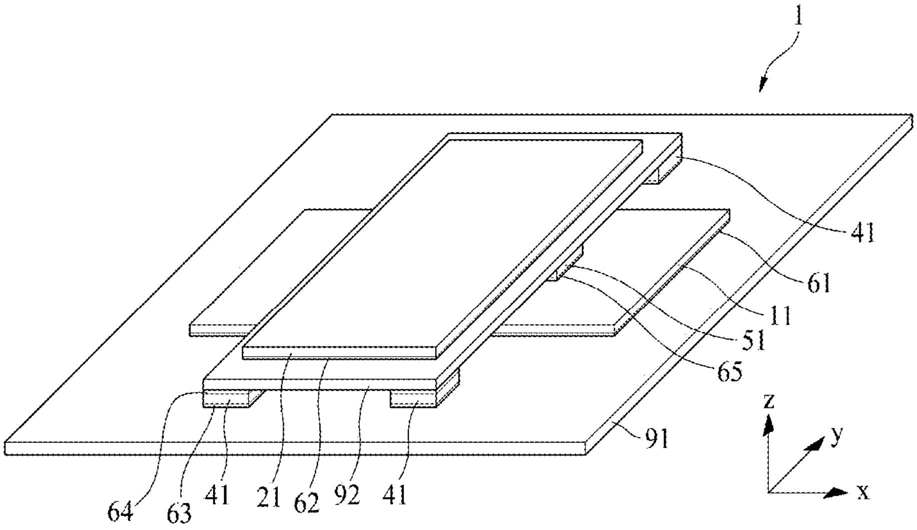
FIG. 11 is a perspective view illustrating a configuration of a sound apparatus according to a third aspect of the present disclosure.
Figure 12:
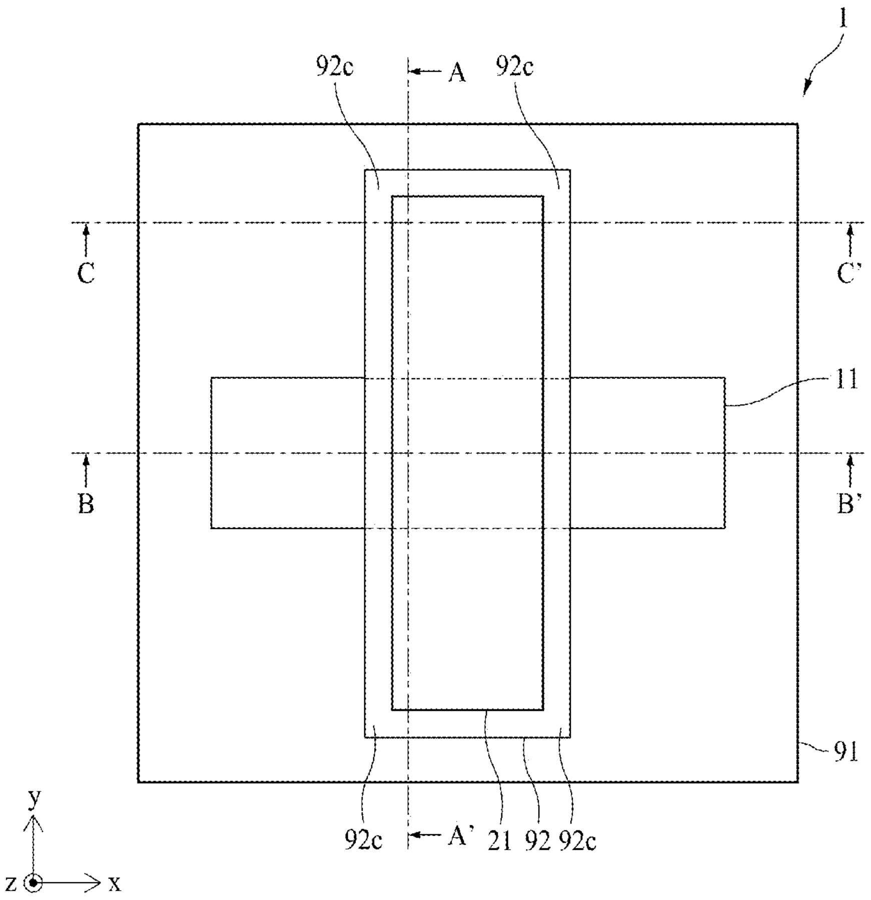
FIG. 12 is a plan view illustrating a configuration of a sound apparatus according to a third aspect of the present disclosure.
Figure 13:
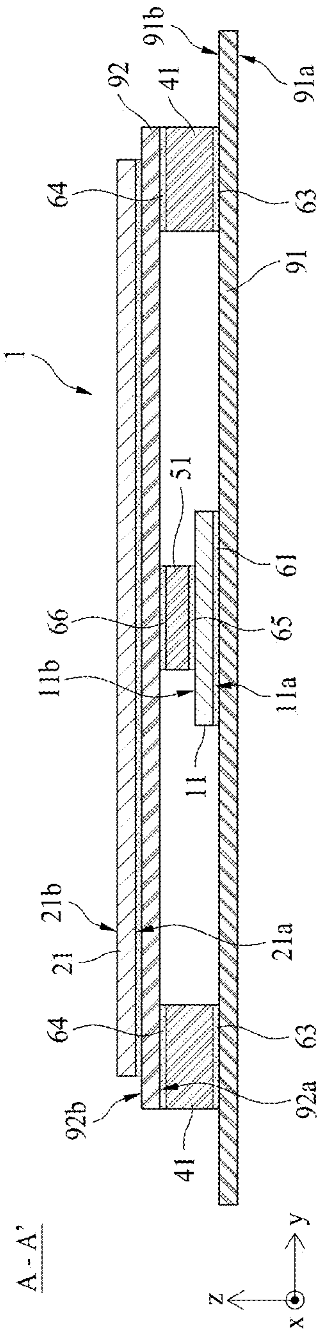
FIG. 13 is a cross-sectional view illustrating a configuration of a sound apparatus according to a third aspect of the present disclosure.
Figure 14:
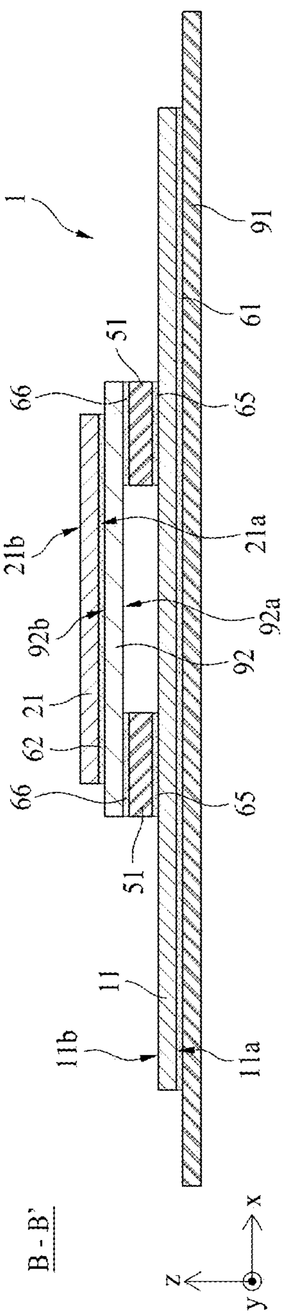
FIG. 14 is a cross-sectional view illustrating a configuration of a sound apparatus according to a third aspect of the present disclosure.
Figure 15:
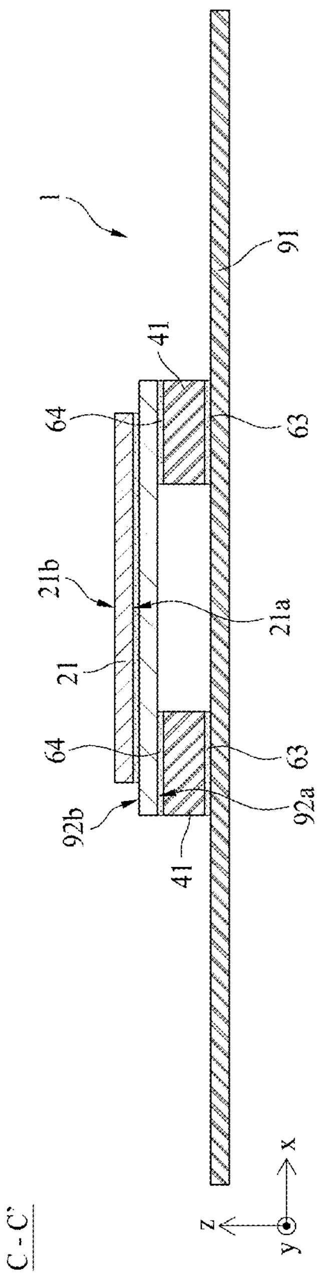
FIG. 15 is a cross-sectional view illustrating a configuration of a sound apparatus according to a third aspect of the present disclosure.
Figure 16:
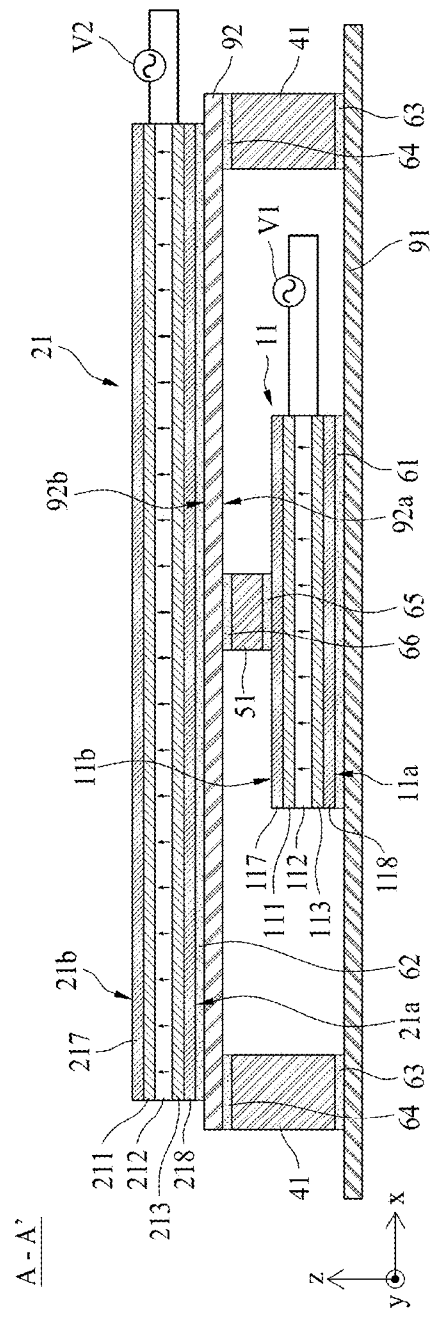
FIG. 16 is a cross-sectional view illustrating a structure of a sound apparatus according to a third aspect of the present disclosure in more detail.

FIG. 11 is a perspective view illustrating a configuration of a sound apparatus according to a third aspect of the present disclosure. FIG. 12 is a plan view illustrating a configuration of a sound apparatus according to a third aspect of the present disclosure. FIGS. 13 to 15 are a cross-sectional view illustrating a configuration of a sound apparatus according to a third aspect of the present disclosure. FIG. 16 is a cross-sectional view illustrating a structure of a sound apparatus according to a third aspect of the present disclosure in more detail. FIGS. 13 and 16 are a cross-sectional view along A-A' of FIG. 12 according to the third aspect of the present disclosure. FIG. 14 is a cross-sectional view along B-B' of FIG. 12 according to the third aspect of the present disclosure. FIG. 15 is a cross-sectional view along C-C' of FIG. 12 according to the third aspect of the present disclosure. A detailed configuration of a sound apparatus 1 according to an aspect of the present disclosure will be described with cross-reference to FIGS. 12 to 16.

As illustrated in FIG. 11, the sound apparatus 1 according to the third aspect of the present disclosure may include a first vibration device 11, a second vibration device 21, elastic members 41 and 51, a first vibration member 91, and a second vibration member 92. As illustrated in FIGS. 11 and 12, the first vibration device 11, the second vibration device 21, and the second vibration member 92 may have a flat plate shape (or a plate shape) having a rectangular shape in a plane. For example, a first main surface 11*a*, 21*a*, and 91*a* and a second main surface 11*b*, 21*b*, 92*b* of each of the first vibration device 11, the second vibration device 21, and the second vibration member 92 may include a short side and a long side in a plane.

As illustrated in FIG. 12, the second vibration member 92 may include four corner portions (or edge portions) 92*c*. The first vibration device 11 and the second vibration device 21 may have a same shape in a plane. Further, each of the first vibration device 11 and the second vibration device 21 may include one or a plurality of piezoelectric devices. In FIGS. 12 to 16, a coordinate-axis is illustrated where a direction parallel to line B-B' and line C-C' may be an x-axis, a direction parallel to line A-A' may be a y-axis, and a direction perpendicular to the x-axis and the y-axis is the z-axis. A direction parallel to the x-axis may be referred to as a first direction, and a direction parallel to the y-axis may be referred to as a second direction. The first direction and the second direction may be perpendicular to each other in a plane.

The first vibration device 11 may include two main surfaces opposite to each other. A surface of the two main surfaces of the first vibration device 11 in an opposite direction side (or negative direction side) of the z-axis may be referred as a first main surface 11*a*, and a surface of the two main surfaces of the first vibration device 11 in a forward direction side (or positive direction side) of the z-axis may be referred as a second main surface 11*b*. Likewise, each of the first vibration device 11 and the second vibration member 92 may each include two main surfaces opposite to each other. A surface of the two main surfaces of the second vibration device 21 in an opposite direction side of the z-axis may be referred as a first main surface 21*a*, and a surface of the two main surfaces of the second vibration device 21 in the forward direction side of the z-axis may be referred as a second main surface 21*b*. Further, a surface of the two main surfaces of the second vibration member 92 in an opposite direction side of the z-axis may be referred as a first main surface 92*a*, and a surface of the two main surfaces of the second vibration member 92 in the forward direction side of the z-axis may be referred as a second main surface 92*b*. Each corner portion (or edge portion) 92*c* of the second vibration member 92 may include a portion of a first main surface 92*a* and a portion of a second main surface 92*b*.

The first vibration device 11 may be disposed on a main surface of the first vibration member 91. In detail, as illustrated in FIGS. 13 and 14, a front surface of the first main surface 11*a* of the first vibration device 11 may be connected to (or contact) the first vibration member 91. For example, the first vibration device 11 and the first vibration member 91 may be connected to (or contact) each other through (or by) an adhesive member (or an adhesive layer or an adhesive or a first adhesive member) 61. Because the front surface of the first main surface 11*a* of the first vibration device 11 is connected to (or contact) the first vibration member 91, the stiffness of the first vibration device 11 may increase, and a crack of the first vibration device 11 may be prevented from occurring when a high sound pressure level is input. A vibration generated from the first vibration device 11 by an input driving signal (or voice signal or sound signal) may be transferred to the first vibration member 91 directly (or through (or by) the adhesive member 61). For example, the front surface of the first main surface 11*a* of the first vibration device 11 may be connected to the main surface of the first vibration member 91 by an entire surface attachment scheme by the adhesive member 61.

The second vibration member 92 may be disposed on the first vibration device 11. In detail, as illustrated in FIGS. 11, 13, and 14, two elastic members 51 may be disposed on the second main surface 11*b* of the first vibration device 11. Moreover, the elastic member 51 may be connected to (or contact) a portion of the first main surface 92*a* of the second vibration member 92. For example, the second vibration member 92 may be connected to (or contact) the first vibration device 11 through (or by) the elastic member 51. Furthermore, the second vibration member 92 may not directly contact the first vibration device 11. For example, the first main surface 92*a* of the second vibration member 92 may be spaced apart from the second main surface 11*b* of the first vibration device 11 by a certain (or a pre-defined) distance and may be disposed to be opposite thereto. A certain (or a pre-defined) distance between the first main surface 92*a* of the second vibration member 92 and the second main surface 11*b* of the first vibration device 11 may correspond to a thickness of the elastic member 51 (a height of the elastic member 51 in a z-axis direction). For example, the elastic member 51 may be connected to the second main surface 11*b* of the first vibration device 11 through (or by) the adhesive member (or a fifth adhesive member) 65 and may be connected to the first main surface 92*a* of the second vibration member 92 through (or by) the adhesive member (or a sixth adhesive member) 66.

The second vibration device 21 may be disposed on the second main surface 92*b* of the second vibration member 92. In detail, a front surface of the first main surface 21*a* of the second vibration device 21 may be connected to (or contact) the second main surface 92*b* of the second vibration member 92. For example, the second vibration device 21 and the second vibration member 92 may be connected to (or contact) each other through (or by) an adhesive member (or an adhesive layer or an adhesive or a second adhesive member) 62. Because the front surface of the first main surface 21*a* of the second vibration device 21 is connected to (or contact) the second vibration member 92, the stiffness of the second vibration device 21 may increase, and a crack of the second vibration device 21 may be prevented from occurring when a high sound pressure level is input. A vibration generated from the second vibration device 21 by an input driving signal (or voice signal or sound signal) may be transferred to the second vibration member 92 directly (or through (or by) the adhesive member 62).

As illustrated in FIGS. 11, 13, and 15, four elastic members 41 may be disposed at the corner portion (or edge portion) 92*c* of the second vibration member 92 and may be connected to (or contact) the first main surface 92*a* of the second vibration member 92. Further, the elastic member 41 may be connected to (or contact) a portion of the main surface of the first vibration member 91. For example, the second vibration member 92 may be connected to the first vibration member 91 through (or by) the elastic member 41.

Furthermore, in the cross-sectional view of FIG. 13, an end surface (or a distal end surface) of the elastic member 41 facing a second direction may be aligned with an end surface (or a distal end surface) of the second vibration member 92 facing the second direction. Further, in the cross-sectional view of FIG. 14, an end surface (or a distal end surface) of the elastic member 41 and 51 facing a first direction may be aligned with an end surface (or a distal end surface) of the second vibration member 92 facing the first direction. Likewise, in the cross-sectional view of FIG. 15, an end surface (or a distal end surface) of the elastic member 41 facing the first direction may be aligned with an end surface (or a distal end surface) of the second vibration member 92 facing the first direction. However, the elastic members 41 and 51 may not be disposed at a position illustrated in FIGS. 13 to 15. For example, the elastic members 41 and 51 may be disposed so that corresponding end surfaces of the elastic members 41 and 51 are disposed more outward than a corresponding end surface (or distal end surface) of the second vibration member 92. Alternatively, the elastic members 41 and 51 may be disposed so that corresponding end surfaces of the elastic members 41 and 51 are disposed more inward than a corresponding end surface (or distal end surface) of the second vibration member 92. For example, the four elastic members 41 may be disposed (or interposed) between a corner portion (or an edge portion) 92*c* of the first main surface 92*a* of the second vibration member 92 and a main surface of the first vibration member 91. For example, each of the two elastic members 51 may be disposed between two adjacent elastic members 41 along a length direction (or a longitudinal direction) of the long side of the second vibration member 92 of the four elastic members 41. For example, each of the two elastic members 51 may be disposed or connected between the first main surface 92*a* of the second vibration member 92 and the second main surface 11*b* of the first vibration device 11, between two adjacent elastic members 41 of the four elastic members 41.

Moreover, as illustrated in FIG. 12, the first vibration device 11 may be disposed so that a pair of long sides facing each other are parallel to the first direction in a plane, and a pair of short sides facing each other are parallel to the second direction in a plane. Meanwhile, the second vibration device 21 and the second vibration member 92 may be disposed so that a pair of long sides facing each other are parallel to the second direction in a plane, and a pair of short sides facing each other are parallel to the first direction in a plane. For example, the second vibration device 21 and the second vibration member 92 may be disposed so that long sides of the second main surfaces 21*b* and 92*b* of the second vibration device 21 and the second vibration member 92 intersect with a long side of the second main surface 11*b* of the first vibration device 11 in a plane. In more detail, the second vibration device 21 and the second vibration member 92 may be disposed so that long sides of the second main surfaces 21*b* and 92*b* of the second vibration device 21 and the second vibration member 92 are perpendicular to a long side of the first main surface 11*b* of the first vibration device 11 in a plane. Further, the second vibration device 21 and the second vibration member 92 may be disposed so that short sides of the second main surfaces 21*b* and 92*b* of the second vibration device 21 and the second vibration member 92 are parallel to a long side of the second main surface 11*b* of the first vibration device 11 in a plane. For example, the first vibration device 11 according to the third aspect of the present disclosure may be disposed in a direction in which rotation has been performed by 90 degrees with respect to an axis (or a z-axis) perpendicular to the first main surface 21*a* and the second main surface 21*b* of the second vibration device 21. Also, a rotation angle of the first vibration device 11 with respect to the second vibration device 21 is not limited to 90 degrees and may be adjusted to an arbitrary angle.

The aspect of the structure of the sound apparatus 1 will be described in more detail with reference to FIG. 16. FIG. 16 is an enlarged view of illustrating the first vibration device 11 and the second vibration device 21 at a same section as that of FIG. 13. Moreover, in FIG. 16, a connection relationship of each electrode included in the first vibration device 11 and the second vibration device 21 schematically illustrates by a circuit diagram to describe a method for inputting a driving signal to the sound apparatus 1.

The first vibration device 11 may include an electrode (or a first electrode) 111, a vibration layer (or a piezoelectric layer) 112, and an electrode (or a second electrode) 113. The electrode 111 and the electrode 113 may be disposed with the vibration layer 112 therebetween in a thickness direction. A voltage V1 may be applied to the vibration layer 112 through (or by) the electrode 111 and the electrode 113. The voltage V1 may correspond to a driving signal (or a voice signal or a sound signal).

The first vibration device 11 may further include a protection layer (or a protection member) 117. The protection layer 117 may be configured to protect and/or insulate an upper surface of the electrode 111. The first vibration device 11 may further include a second protection layer (or a second protection member) 118. The second protection layer 118 may be configured to protect and/or insulate a lower surface of the electrode 113. For example, one or more of the protection layer 117 and the second protection layer 118 may be omitted. For example, the protection layers 117 and 118 may be a polyimide film, a polyethylene terephthalate film, or polyethylene naphthalate film, but aspects of the present disclosure are not limited thereto. In an aspect of the present disclosure, a polarization direction (or a poling direction) of the vibration layer 112 may be a forward direction (or a positive direction) or an opposite direction (or a negative direction) of the z-axis, as illustrated in FIG. 16. Further, wires (or lines) configured to apply a voltage to each electrode may be connected to (or contact) the electrodes 111 and 113 by soldering or the like.

The first vibration device 11 may be connected to the first vibration member 91 by an adhesive member (or a first adhesive member) 61. The adhesive member 61 may be configured to connect the first vibration device 11 to a main surface of the first vibration member 91. For example, the first vibration device 11 may be connected to the main surface of the first vibration member 91 by an entire surface attachment scheme by the adhesive member 61.

The second vibration device 21 may include an electrode (or a first electrode) 211, a vibration layer (or a piezoelectric layer) 212, and an electrode (or a second electrode) 213. The electrode 211 and the electrode 213 may be disposed with the vibration layer 212 therebetween in a thickness direction. A voltage V2 may be applied to the vibration layer 212 through (or by) the electrode 211 and the electrode 213. The voltage V2 may correspond to a driving signal (or a voice signal or a sound signal). The voltage V2 may have a same phase as the voltage V1 applied to the first vibration device 11, and may have a phase which is opposite to a phase of the voltage V1.

The second vibration device 21 may further include a protection layer (or a first protection member) 217. The protection layer 217 may be configured to protect and/or insulate an upper surface of the electrode 211. The second vibration device 21 may further include a second protection layer (or a second protection member) 218. The second protection layer 218 may be configured to protect and/or insulate a lower surface of the electrode 213. For example, one or more of the protection layer 217 and the second protection layer 218 may be omitted. For example, the protection layers 217 and 218 may be a polyimide film, a polyethylene terephthalate film, or polyethylene naphthalate film, but aspects of the present disclosure are not limited thereto.

The second vibration device 21 may be connected to the second vibration member 92 by an adhesive member (or a second adhesive member) 62. The adhesive member 62 may be configured to connect the second vibration device 21 to a main surface 92*b* of the second vibration member 92. For example, the second vibration device 21 may be connected to the main surface 92*b* of the second vibration member 92 by an entire surface attachment scheme by the adhesive member 62. For example, phases of an input voltage V1 and an input voltage V2 may be appropriately changed based on an elastic modulus (or Young's modulus) of each of the elastic member 41, the elastic member 51, and the second vibration member 92, which are used in the sound apparatus 1. In an aspect of the present disclosure, a polarization direction (or a poling direction) of the vibration layer 112 may be a forward direction (or a positive direction) or an opposite direction (or a negative direction) of the z-axis, as illustrated in FIG. 16. Lines (or wires) configured to apply a voltage to each electrode may be connected to (or contact) the electrodes 111 and 113 by soldering or the like.

A voltage applied to each of the first vibration device 11 and the second vibration device 21 may be based on a voice signal, and thus, may be an alternating current (AC) voltage based on a frequency of a voice which should be generated. In FIG. 16, an AC voltage supplied to the first vibration device 11 may be V1, and an AC voltage supplied to the second vibration device 21 may be V2. One terminal of an AC power source may be connected to (or contact) the electrode 111 and the electrode 211, and the other terminal of the AC power source may be connected to (or contact) the electrode 113 and the electrode 213. Moreover, in FIG. 16, two AC power sources are illustrated, but one AC power source may be used. For example, when the voltage V2 has a same phase as that of the voltage V1 applied to the first vibration device 11, a driving signal may be supplied from one (common) AC power source to the first vibration device 11 and the second vibration device 21. For example, one terminal of the one (common) AC power source may be connected to (or contact) the electrode 111 and the electrode 211, and the other terminal of the one (common) AC power source may be connected to (or contact) the electrode 113 and the electrode 213. Further, when the voltage V2 has a phase which is opposite to that of the voltage V1 applied to the first vibration device 11, a driving signal may be supplied from the one (common) AC power source to the first vibration device 11 and the second vibration device 21. For example, one terminal of the one (common) AC power source may be connected to (or contact) the electrode 111 and the electrode 213, and the other terminal of the one (common) AC power source may be connected to (or contact) the electrode 113 and the electrode 211.

When an AC voltage is applied between the electrode 111 and the electrode 113 of the first vibration device 11, the vibration layer 112 may contract and expand, and a periodic stress may be applied to the first vibration member 91. For example, the first vibration device 11 may transfer a periodic stress to the first vibration member 91, and the first vibration member 91 may flexurally vibrate based on the transferred stress. A vibration (for example, a sound) based on a voice signal may be generated by a vibration of the first vibration member 90 based on the transferred stress. Likewise, when an AC voltage is applied between the electrode 211 and the electrode 213 of the second vibration device 21, the vibration layer 212 may contract and expand, and a periodic stress may be applied to the first vibration member 91 through (or by) the elastic member 41, the elastic member 51, and the first vibration device 11. The first vibration member 91 may flexurally vibrate based on the transferred stress, and a vibration and/or a sound based on a voice signal may be generated.

Material of the vibration layer 112 and the vibration layer 222 is not particularly limited thereto, but may include ferroelectric ceramic, having good piezoelectric properties, such as lead zirconate titanate (PZT)-based materials or the like to increase the amount of displacement. As another example, material used as material of the vibration layer 112 and the vibration layer 222 may include a piezoelectric material of a ceramic-based material capable of implementing a relatively strong vibration. As another example, the vibration layer 112 and the vibration layer 222 may include a piezoelectric ceramic material having a perovskite-based crystal structure. Moreover, the vibration layer 112 and the vibration layer 222 may have a polycrystalline structure or a single-crystalline structure. For example, the vibration layer 112 and the vibration layer 222 may be configured as the polycrystalline ceramic or the single-crystalline ceramic. Further, the vibration layer 112 and the vibration layer 222 may be configured as a PVDF (Polyvinylidene fluoride)-based material or material including a piezoelectric material including lead (Pb), or may be configured as a piezoelectric material without lead (Pb). For example, the piezoelectric material including lead (Pb) may include one or more of a lead zirconate titanate (PZT)-based material, a lead zirconate nickel niobate (PZNN)-based material, a lead magnesium niobate (PMN)-based material, a lead nickel niobate (PNN)-based material, a lead zirconate niobate (PZN)-based material, or a lead indium niobate (PIN)-based material, but aspects of the present disclosure are not limited thereto. For example, the piezoelectric material without lead (Pb) may include one or more of barium titanate ($BaTiO_3$), calcium titanate ($CaTiO_3$), and strontium titanate ($SrTiO_3$), but aspects of the present disclosure are not limited thereto.

The adhesive layer 61 and the adhesive layer 62 may be configured as a compressed resin material, an adhesive, or an adhesive tape or the like, but aspects of the present disclosure are not limited thereto. An elastic modulus of the adhesive member 61 may be equal to or different from an elastic modulus of the adhesive member 62. For example, the adhesive member 61 may have an elastic modulus which is smaller than that of the adhesive member 62. Moreover, a lateral surface of each of the first vibration device 11 and the second vibration device 21, and the third vibration device 31 may be covered by an insulator such as resin or the like to prevent an electrical short circuit between the vibration devices and the other members.

Material of the first electrodes 111 and 211 and the second electrodes 113 and 213 of each of the first vibration device 11 and the second vibration device 21 may include a transparent conductive material, a semitransparent conductive material, or an opaque conductive material. For example, as the transparent or semitransparent conductive material, the first electrode and the second electrode may include one or more of indium tin oxide (ITO) or indium zinc oxide (IZO), but aspects of the present disclosure are not limited thereto. As the opaque conductive material, the first electrode and the second electrode may include one of an aluminum (Al), a copper (Cu), a gold (Au), a silver (Ag), a molybdenum (Mo), and a magnesium (Mg), or an alloy thereof, but aspects of the present disclosure are not limited thereto.

The sound apparatus 1 according to the present aspect may prevent the occurrence of a crack and may generate a flat and high sound pressure level in a broad frequency band in a low-middle-pitched sound band. According to the third aspect of the present disclosure, the sound quality of a sound apparatus may be further enhanced.

Fourth Aspect

Figure 17:
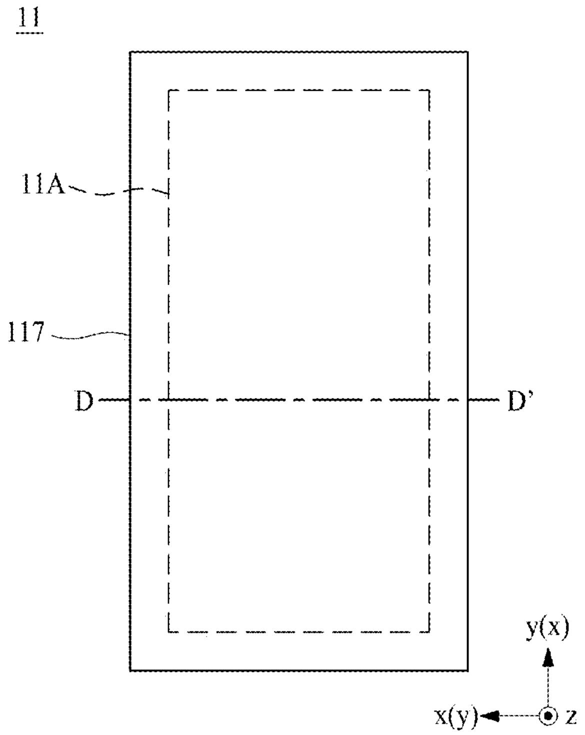
FIG. 17 is a plan view illustrating a structure of a vibration device according to a fourth aspect of the present disclosure.
Figure 18:
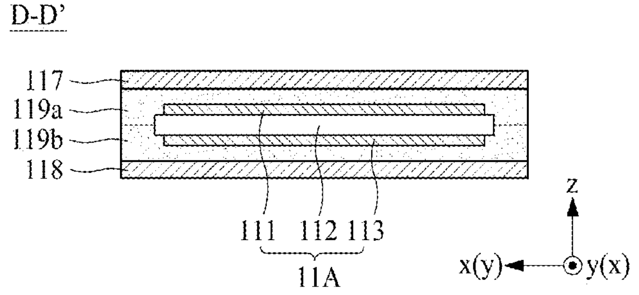
FIG. 18 is a cross-sectional view taken along line D-D' illustrated in FIG. 17 according to a fourth aspect of the present disclosure.

In the following description, a modification example aspect of a structure of a vibration device in the sound apparatus 1 according to the fourth aspect of the present disclosure will be described. FIG. 17 is a plan view illustrating a configuration of a vibration device according to the fourth aspect of the present disclosure. FIG. 18 is a cross-sectional view along D-D' of FIG. 17 according to the fourth aspect of the present disclosure. FIGS. 17 and 18 illustrate a configuration of a vibration device illustrated in FIGS. 2 to 7 and 9 to 16 according to the first to third aspects of the present disclosure.

As illustrated in FIGS. 17 and 18, a vibration device 11 according to an aspect of the present disclosure may include a vibration generating part (or vibration part) 11A.

The vibration generating part 11A may include a vibration layer 112, a first electrode 111 at a first surface of the vibration layer 112, and a second electrode 113 at a second surface different from the first surface of the vibration layer 112. The vibration layer 112 may be substantially a same as the vibration layer 112 described in FIG. 7 or 16, and thus, repeated descriptions are omitted. The first electrode 111 and the second electrode 113 may be disposed with the vibration layer 112 therebetween in a thickness direction, and the first electrode 111 and the second electrode 113 may apply a voltage to the vibration layer 112. A polarization direction (or a poling direction) of the vibration layer 112 may be a forward direction (or a positive direction) of the z-axis or an opposite direction (or a negative direction) of the z-axis. Moreover, wires (or lines) configured to apply a voltage to each electrode may be connected to the electrodes 111 and 113.

The first vibration device 11 according to an aspect of the present disclosure may further include a first protection layer (or first protection member) 117 and a second protection layer (or second protection member) 118. The first protection layer 117 may be connected to a first surface (or front surface or upper surface) of the vibration generating part 11A. The first protection layer 117 may protect and insulate the first surface of the vibration generating part 11A. The second protection layer 118 may be connected to a second surface (or rear surface or lower surface) of the vibration generating part 11A. The second protection layer 118 may protect and insulate the second surface of the vibration generating part 11A. For example, any one of the first protection layer 117 and the second protection layer 118 in the first vibration device 11 may be connected to the vibration member through (or by) adhesive layers 119*a* and 119*b*. For example, the adhesive layers 119*a* and 119*b* may be configured in an adhesive resin material, an adhesive, or an adhesive tape, or the like, but aspects of the present disclosure are not limited thereto. The adhesive layers 119*a* and 119*b* may include epoxy-based, acrylic-based, silicone-based, or urethane-based, but aspects of the present disclosure are not limited thereto.

The first protection layer 117 may be connected or coupled to the first electrode 111 by a first adhesive layer 119*a*. The second protection layer 118 may be connected or coupled to the second electrode 113 by a second adhesive layer 119*b*. The first adhesive layer 119*a* and the second adhesive layer 119*b* may be configured at a region between the first protection layer 117 and the second protection layer 118 to completely surround the vibration generating part 11A. For example, the vibration generating part 11A may be embedded or built-in at a region between the first adhesive layer 119*a* and the second adhesive layer 119*b*. For example, the first adhesive layer 119*a* and the second adhesive layer 119*b* may be a polyimide film, a polyethylene terephthalate film, or polyethylene naphthalate film, but aspects of the present disclosure are not limited thereto.

A configuration of the second vibration device 21 according to an aspect of the present disclosure may be substantially a same as the fourth aspect of the present disclosure, and thus, its descriptions may be omitted.

Fifth Aspect

Figure 19:
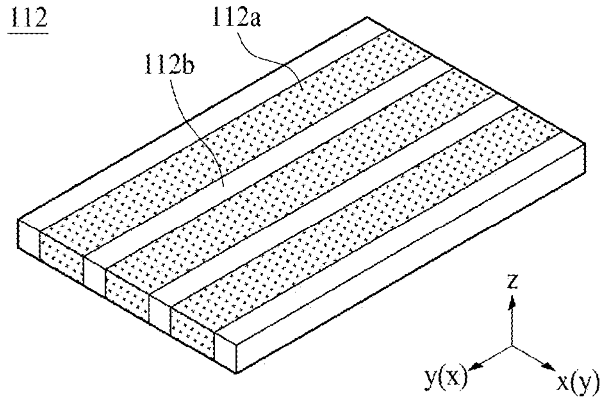
FIG. 19 is a perspective view illustrating a vibration layer of a vibration device according to a fifth aspect of the present disclosure.

In the following description, a modification example aspect of the structure of a vibration layer in the vibration device of the sound apparatus 1 according to the fifth aspect of the present disclosure will be described. FIG. 19 is a perspective view illustrating a vibration layer in a vibration device of the sound apparatus according to the fifth aspect of the present disclosure.

As illustrated in FIG. 19, in the first vibration device 11 according to the fifth aspect of the present disclosure, a vibration layer 112 of a vibration generating part 11A may include a plurality of first portions 112*a* and one or more second portions 112*b*. For example, the vibration layer 112 may include a plurality of first portions 112*a* and a plurality of second portions 112*b* between the plurality of first portions 112*a*. For example, the plurality of first portions 112*a* and the plurality of second portions 112*b* may be alternately and repeatedly disposed along an x-axis direction, but aspects of the present disclosure are not limited thereto.

Each of the plurality of first portions 112*a* may include an inorganic material having a piezoelectric characteristic. For example, each of the plurality of first portions 112*a* may be an inorganic material portion or a piezoelectric material portion. Each of the plurality of first portions 112*a* may have a first width parallel to the along the x-axis direction and may be extended along a y-axis direction. Each of the plurality of first portions 112*a* may be substantially a same as the vibration layer 112 described above with reference to FIG. 7 or 16, and thus, repeated descriptions may be omitted.

Each of the plurality of second portions 112*b* may be disposed at a region between the plurality of first portions 112*a*. For example, each of the plurality of first portions 112*a* may be disposed at a region between two adjacent second portions 112*b* of the plurality of second portions 112*b*. For example, the plurality of first portions 112*a* and the plurality of second portions 112*b* may include a line shape or a stripe shape which has a same size or different sizes.

Each of the plurality of second portions 112*b* may be configured to fill a gap between two adjacent first portions of the plurality of first portions 112*a*. Each of the plurality of first portions 112*a* and the plurality of second portions 112*b* may be disposed (or arranged) at a same plane (or a same layer) in parallel with each other. Each of the plurality of second portions 112*b* may absorb an impact applied to the first portions 112*a*, and thus, may enhance the durability of the first portions 112*a* and provide flexibility to the first vibration device 11. Each of the plurality of second portions 112*b* may include an organic material having a ductile characteristic. For example, each of the plurality of second portions 112*b* may include one or more of an epoxy-based polymer, an acrylic-based polymer, and a silicone-based polymer, but aspects of the present disclosure are not limited thereto. For example, each of the plurality of second portions 112*b* may be an organic portion, an organic material, an adhesive portion, a stretch portion, a bending portion, a damping portion, an elastic portion, an elasticity portion, or a ductile portion, or the like, but aspects of the present disclosure are not limited thereto.

A first surface of each of the plurality of first portions 112*a* and the plurality of second portions 112*b* may be connected to the first electrode in common. A second surface of each of the plurality of first portions 112*a* and the plurality of second portions 112*b* may be connected to the second electrode in common.

In the first vibration device 11 of the sound apparatus 1 according to the fifth aspect of the present disclosure, the plurality of first portions 112*a* and the plurality of second portion 112*b* may be disposed on (or connected to) a same plane, and thus, the vibration layer 112 may have a single thin film-type. Accordingly, the first vibration device 11 may be vibrated in a vertical direction by the first portions 112*a* having a vibration characteristic and may be bent in a curved shape by the second portions 112*b* having flexibility. For example, the first vibration device 11 including the vibration layer 112 may have a 2-2 composite structure, and thus, may have a resonance frequency of 20 kHz or less, but aspects of the present disclosure are not limited thereto.

A configuration of the second vibration device 21 according to the fifth aspect of the present disclosure may be substantially a same as the fourth aspect of the present disclosure, and thus, its descriptions may be omitted.

Sixth Aspect

Figure 20:
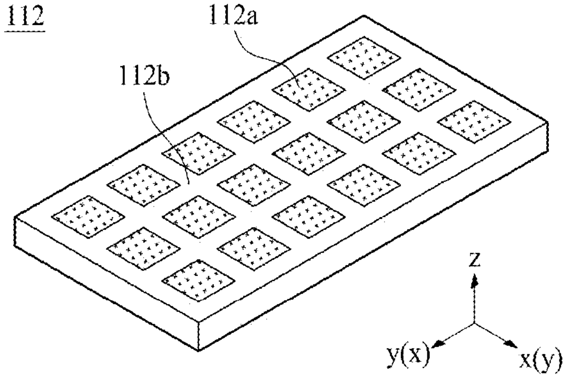
FIG. 20 is a perspective view illustrating a vibration layer of a vibration device according to a sixth aspect of the present disclosure.

In the following description, a modification example aspect of the structure of a vibration layer in a vibration device of the sound apparatus 1 according to the sixth aspect of the present disclosure will be described. FIG. 20 is a perspective view illustrating a vibration layer in a vibration device of the sound apparatus according to the sixth aspect of the present disclosure.

As illustrated in FIG. 20, in the first vibration device 11 according to the sixth aspect of the present disclosure, a vibration layer 112 of the vibration generating part 11A may include a plurality of first portions 112*a* and a second portion 112*b*. For example, the vibration layer 112 may include a plurality of first portions 112*a* and a second portion 112*b* which is disposed between the plurality of first portions 112*a*.

Each of the plurality of first portions 112*a* may be disposed to be spaced apart from one another along each of an x-axis direction and a y-axis direction. For example, each of the plurality of first portions 112*a* may have a hexahedral shape having a same size and may be disposed in a lattice shape. Each of the plurality of first portions 112*a* may be substantially a same as the first portion 112*a* described above with reference to FIG. 19, and thus, repeated descriptions may be omitted.

The second portion 112*b* may be disposed between the plurality of first portions 112*a* along each of the x-axis direction and the y-axis direction. The second portion 112*b* may be configured to fill a gap or a space between two adjacent first portions 112*a* or to surround each of the plurality of first portions 112*a*, and thus, the second portion 112*b* may be connected to or attached on lateral surface of adjacent first portion 112*a*. The second portion 112*b* may be substantially a same as the second portions 112*b* described above with reference to FIG. 19, and thus, repeated descriptions may be omitted.

A first surface of each of the plurality of first portions 112*a* and the second portion 112*b* may be connected to a first electrode in common. A second surface of each of the plurality of first portions 112*a* and the second portion 112*b* may be connected to a second electrode in common.

In the first vibration device 11 of the sound apparatus according to the sixth aspect of the present disclosure, the plurality of first portions 112*a* and the second portion 112*b* may be disposed on (or connected to) a same plane, and thus, the vibration layer 112 may have a single thin film-type. Accordingly, the first vibration device 11 may be vibrated in a vertical direction by the first portions 112*a* having a vibration characteristic and may be bent in a curved shape by the second portions 112*b* having flexibility. For example, the first vibration device 11 including the vibration layer 112 may have a 1-3 composite structure, and thus, may have a resonance frequency of 20 kHz or less, but aspects of the present disclosure are not limited thereto.

A configuration of the second vibration device 21 according to the sixth aspect of the present disclosure may be substantially a same as the fifth aspect of the present disclosure, and thus, its descriptions may be omitted.

Seventh Aspect

In the following description, a modification example aspect of the structure of a vibration layer in the sound apparatus 1 according to the seventh aspect of the present disclosure will be described.

Figure 21:
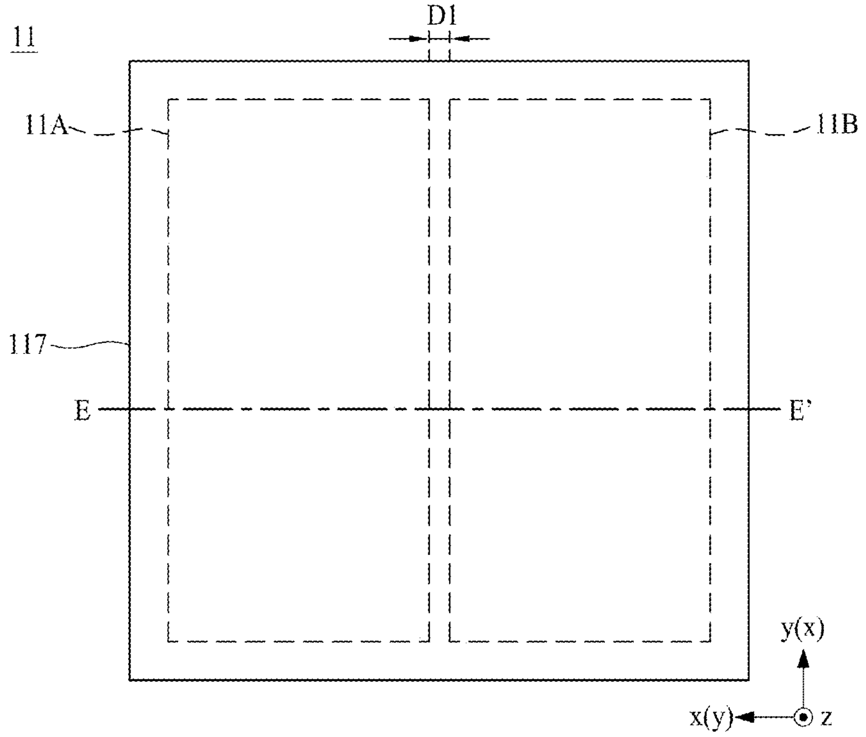
FIG. 21 is a plan view illustrating a structure of a vibration device according to a seventh aspect of the present disclosure.
Figure 22:
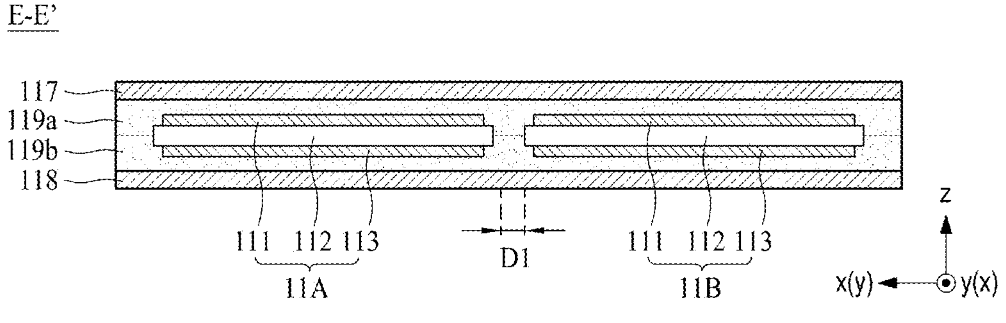
FIG. 22 is a cross-sectional view taken along line E-E' illustrated in FIG. 21 according to a seventh aspect of the present disclosure.

FIG. 21 is a plan view illustrating a configuration of a vibration layer of a sound apparatus according to the seventh aspect of the present disclosure. FIG. 22 is a cross-sectional view taken along line E-E' of FIG. 21 according to the seventh aspect of the present disclosure. FIGS. 21 and 22 illustrate a configuration of a vibration device illustrated in FIGS. 2 to 7 and 9 to 16 according to the first to third aspects of the present disclosure.

As illustrated in FIGS. 21 and 22, a first vibration device 11 according to the seventh aspect of the present disclosure may include at least two or more vibration generating parts (or vibration parts) 11A and 11B. For example, the first vibration device 11 may include a first vibration generating part 11A and a second vibration generating part 11B.

Each of the first and second vibration generating parts 11A and 11B may be electrically separated and disposed while being spaced apart from each other along an x-axis direction. Each of the first and second vibration generating parts 11A and 11B may alternately and repeatedly contract and/or expand based on a piezoelectric effect to vibrate. For example, the first and second vibration generating parts 11A and 11B may be disposed or tiled in a first interval (or a first distance) D1 along the x-axis direction (or a y-axis direction). Each of the first and second vibration generating parts 11A and 11B may be disposed or tiled on a same plane, and thus, the first vibration device 11 may have an enlarged area based on tiling of the first and second vibration generating parts 11A and 11B having a relatively small size. Thus, the first vibration device 11 in which the first and second vibration generating parts 11A and 11B are tiled may be a vibration array, a vibration array portion, a vibration module array portion, a vibration array structure, a tiling vibration array, a tiling vibration array module, or a tiling vibration film, but aspects of the present disclosure are not limited thereto.

Each of the first and second vibration generating parts 11A and 11B may be disposed or tiled in the first interval D1, and thus, may be implemented as one vibration apparatus (or a single vibration apparatus) which is driven as one complete single-body without being independently driven. With respect to the x-axis direction, the first interval D1 between the first and second vibration generating parts 11A and 11B may be 0.1 mm or more and less than 3 cm, but aspects of the present disclosure are not limited thereto.

The first and second vibration generating parts 11A and 11B may be disposed in the first interval D1 of 0.1 mm or more and less than 5 mm, increasing a reproduction band of a sound generated by interconnecting a single-body vibration of the first and second vibration generating parts 11A and 11B and increasing a sound of a low-pitched sound band (for example, a sound pressure level characteristic in 500 Hz (hertz) or less). For example, when the first and second vibration generating parts 11A and 11B are disposed in the first interval D1 of less than 0.1 mm or without the first interval D1, the reliability of the first and second vibration generating parts 11A and 11B or the vibration device 11 and the vibration device 21 in may be reduced due to damage or a crack caused by a physical contact therebetween which occurs when each of the first and second vibration generating parts 11A and 11B vibrates.

Each of the first and second vibration generating parts 11A and 11B may include a vibration layer 112, a first electrode 111 at a first surface of the vibration layer 112, and a second electrode 113 at a second surface different from (or opposite to) the first surface of the vibrating layer 112. The vibration layer 112 is substantially a same as the vibration layer 112 described above with reference to FIG. 7 or 16, and thus, repeated descriptions may be omitted. According to another modification example aspect of the present disclosure, the vibration layer 112 may include a plurality of first portions 112*a* and a plurality of second portion 112*b* in a same manner as the modification example aspect illustrated in FIG. 19, or the vibration layer 112 may include a plurality of first portions 112*a* and a second portion 112*b* in a same manner as the modification example aspect illustrated in FIG. 20, and thus, repeated descriptions may be omitted.

The first electrode 111 and the second electrode 113 may be disposed with the vibration layer 112 therebetween in a thickness direction and may apply a voltage to the vibration layer 112. A polarization direction (or a poling direction) of the vibration layer 112 may be a forward direction or an opposite direction of the z-axis. Moreover, wires (or lines) configured to apply a voltage to each electrode may be connected to the electrodes 111 and 113 by soldering or the like.

The first vibration device 11 according to an aspect of the present disclosure may further include a first protection layer (or a first protection member) 117 and a second protection layer (or a second protection member) 118. The first protection layer 117 may be connected to a first surface (or a front surface or an upper surface) of each of the first and second vibration generating parts 11A and 11B in common. The first protection layer 117 may protect the first surface of each of the first and second vibration generating parts 11A and 11B. The second protection layer 118 may be connected to a second surface (or a rear surface or a lower surface) of each of the first and second vibration generating parts 11A and 11B in common. The second protection layer 118 may protect the second surface of each of the first and second vibration generating parts 11A and 11B. For example, the first protective layer 117 and the second protective layer 118 may be a polyimide film, a polyethylene terephthalate film, or polyethylene naphthalate film, but aspects of the present disclosure are not limited thereto.

The first protection layer 117 may be connected or coupled to the first electrode 111 by a first adhesive layer 119*a*. The second protection layer 118 may be connected or coupled to the second electrode 113 by a second adhesive layer 119*b*. The first adhesive layer 119*a* and the second adhesive layer 119*b* may be configured at a region between the first protection layer 117 and the second protection layer 118 to surround the first and second vibration generating parts 11A and 11B. For example, the first adhesive layer 119*a* and second adhesive layer 119*b* may be configured at a region between the first protection layer 117 and the second protection layer 118 to completely surround the first and second vibration generating parts 11A and 11B, without being limited thereto. The first adhesive layer 119*a* and second adhesive layer 119*b* may be connected to each other at a region between the first vibration generating portion 11A and the second vibration generating portion 11B. For example, the first and second vibration generating parts 11A and 11B may be embedded or built-in at a region between the first adhesive layer 119*a* and the second adhesive layer 119*b*. The first adhesive layer 119*a* and second adhesive layer 119*b* may include epoxy-based, acrylic-based, silicone-based, or urethane-based, but aspects of the present disclosure are not limited thereto.

A configuration of the second vibration device 21 according to the seventh aspect of the present disclosure may be substantially a same as the fifth aspect of the present disclosure, and thus, its descriptions may be omitted.

Eighth Aspect

In the following description, a detailed configuration example will be described where the sound apparatus 1 according to the first aspect of the present disclosure is a display apparatus and the vibration member 91 performs a function of a display panel of the display apparatus. Descriptions of common elements which are substantially a same as the first aspect of the present disclosure may be omitted or will be briefly given below.

Figure 23:
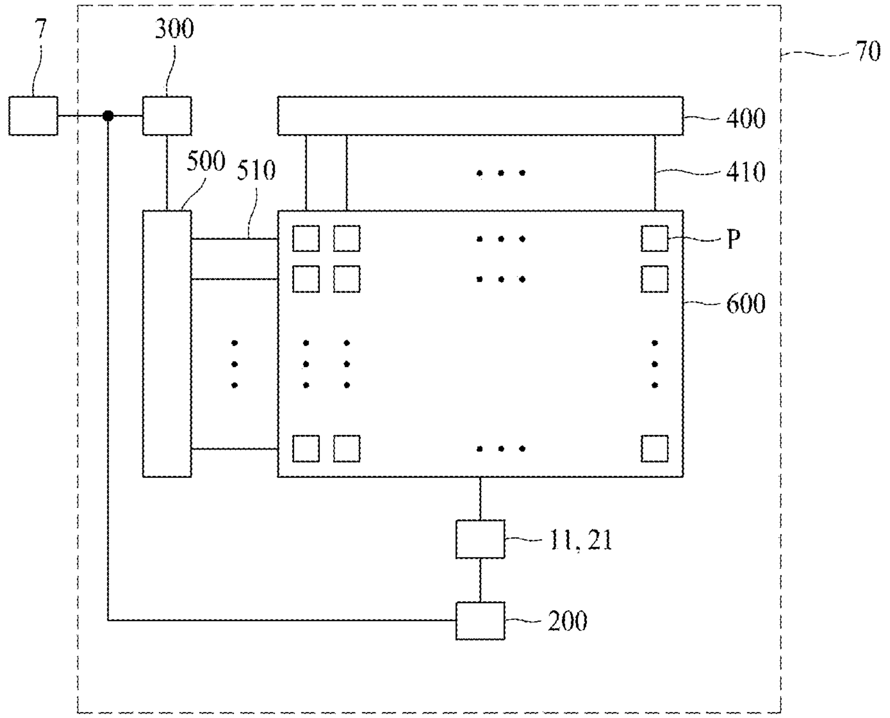
FIG. 23 illustrates a configuration of a display apparatus according to an eighth aspect of the present disclosure.

FIG. 23 is a configuration diagram of a display apparatus 70 according to the eighth aspect of the present disclosure. The use of the display apparatus 70 according to the eighth aspect of the present disclosure may be, for example, electronic posters, digital bulletin boards, electronic advertisement signboards, computer screens, or television receivers, or the like, but aspects of the present disclosure are not limited thereto. A host system 7 and a structure of a first vibration device 11 and a second vibration device 21 may be substantially a same as the first aspect of the present disclosure, and thus, descriptions may be omitted. Moreover, elastic members 41 and 51 or the like according to the first aspect of the present disclosure may be connected to the first vibration device 11 and the second vibration device 21.

As illustrated in FIG. 23, the display apparatus 70 may include a sound apparatus including the first vibration device 11 and the second vibration device 21, a controller 200, a panel controller 300, a data driving circuit 400, a gate driving circuit 500, and a display panel 600. The display apparatus 70 may be an apparatus which displays an image by a display panel 600 based on RGB data (or RGBW data) or the like input thereto and generates a sound based on a driving signal or the like input thereto.

The panel controller 300 may control the data driving circuit 400 and the gate driving circuit 500 based on image data and a timing signal input from the host system 7. The data driving circuit 400 may supply data voltages or the like to a plurality of pixels P through a driving line 410 disposed at each column of the plurality of pixels P. The gate driving circuit 500 may supply a control signal to the plurality of pixels P through a driving line 510 disposed at each row of the plurality of pixels P. Moreover, each of the driving line 410 and the driving line 510 may be provided in a plurality lines (or wires).

The display panel 600 may include the plurality of pixels P disposed to configure a plurality of rows and a plurality of columns. When the display apparatus 70 displays a color image, the pixel P may be a subpixel which displays any one of a plurality of colors (for example, RGB or RGBW data) implementing a color image.

The display panel 600 used to one or more aspects of the present disclosure may use all types (or shapes) of display panels such as a liquid crystal display panel, an organic light emitting display panel, and an electroluminescent display panel, or the like. But aspects of the present disclosure are not limited thereto. The display panel 600 may be a display panel which is vibrated by a sound apparatus according to an aspect of the present disclosure to generate a sound. A types (or shapes) or a size of a display panel 600 applied to a display apparatus 70 according to an aspect of the present disclosure may not limited.

According to one or more aspects of the present disclosure, when the display panel 600 is the liquid crystal display panel, the display panel 600 may include a plurality of gate lines, a plurality of data lines, and a plurality of pixels respectively provided at each of intersection regions of the gate lines and the data lines. In addition, the display panel 600 may include an array substrate including a thin film transistor (TFT) which is a switching element for adjusting a light transmittance of each of the plurality of pixels P, an upper substrate including a color filter and/or a black matrix or the like, and a liquid crystal layer between the array substrate and the upper substrate.

When the display panel 600 is the organic light emitting display panel, the display panel 600 may include a plurality of gate lines, a plurality of data lines, and a plurality of pixels respectively provided at each of intersection regions of the gate lines and the data lines. In addition, the display panel 600 may include an array substrate including a TFT which is an element for selectively applying a voltage to each of the pixels P, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Moreover, a layer formed on the array substrate may include an inorganic light emitting layer (for example, a nano-sized material layer, a quantum dot light emitting layer, or the like). As another aspect of the present disclosure, the layer formed on the array substrate may include a micro light emitting diode.

The display panel 600 may further include a backing such as a metal plate attached on the display panel 600. However, the display panel 600 may include other structures, for example, other structures made of different materials.

Each of the controller 200, the panel controller 300, the data driving circuit 400, and the gate driving circuit 500 may be configured by one semiconductor IC or a plurality of semiconductor integrated circuits. Moreover, some or all of the controller 200, the panel controller 300, the data driving circuit 400, and the gate driving circuit 500 may be integrally configured as one semiconductor integrated circuit (or a single body or one body).

The display apparatus 60 according to an aspect of the present disclosure may be supplied with an image signal (for example, RGB data or RGBW data), a driving signal and a timing signal (a vertical synchronization signal, a horizontal synchronization signal, and a data enable signal, or the like) from the host system 7, and thus, may display an image and/or may generate a sound. The display panel 600 may include an image display surface configured to display an image and a rear surface (or a backside surface) which is opposite to the image display surface. The first vibration device 11 and the second vibration device 21 may be connected to the rear surface of the display panel 600. For example, vibration generated by the first vibration device 11 and the second vibration device 21 may be transferred to the rear surface of the display panel 600. The display panel 600 may include a function of displaying an image and a function of the first vibration member 91 of the first aspect of the present disclosure. In an aspect of the present disclosure, the display apparatus 60 having an acoustic effect where a sound may be generated (or output) from an image displayed from (or by) the display panel 600 may be provided. For example, vibrations of the vibration devices 11 and 21 may be transferred to the rear surface of the display panel 600. For example, the display panel 600 vibrates based on vibrations transferred by the vibration devices 11 and 21. Thus, the sound may be output (or generated) from an image displayed on the image display surface of the display panel 600.

A sound apparatus according to one or more aspects of the present disclosure may be applied to or included into a sound apparatus disposed or included at an apparatus. The apparatus according to an aspect of the present disclosure may be applied to (or included into) mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game apparatuses, notebook computers, monitors, cameras, camcorders, home appliances, etc. Moreover, the sound apparatus according to one or more aspects of the present disclosure may be applied to (or included into) organic light-emitting lighting apparatuses or inorganic light-emitting lighting apparatuses. When the sound apparatus according to one or more aspects of the present disclosure is applied to (or included into), the lighting apparatus may act as lighting and a speaker. Furthermore, when the sound apparatus according to one or more aspects of the present disclosure is applied to (or included into) a mobile device, or the like, the sound apparatus may act as one or more of a speaker, a receiver, and a haptic apparatus, but aspects of the present disclosure are not limited thereto.

A sound apparatus according to an aspect of the present disclosure will be described below.

A sound apparatus according to one or more aspects of the present disclosure may comprise a first vibration member; a first vibration device having a rectangular shape including a first main surface and a second main surface opposite to each other and configured to vibrate based on a driving signal input thereto, the first main surface being connected to the first vibration member; a second vibration member having a rectangular shape including a first main surface and a second main surface opposite to each other, a portion of the first main surface being connected to the first vibration member and a portion of the second main surface of the first vibration device by an elastic member; and a second vibration device having a rectangular shape including a first main surface and a second main surface opposite to each other and configured to vibrate based on a driving signal input thereto, the first main surface being connected to the second main surface of the second vibration member. The first vibration device may be disposed in a direction in which rotation has been performed by a certain angular degree with respect to an axis perpendicular to the first main surface of the second vibration device and the second main surface of the second vibration device.

According to one or more aspects of the present disclosure, the second main surface of the first vibration device may comprise a portion which does not overlap the second main surface of the second vibration device and the second main surface of the second vibration member in a plane.

According to one or more aspects of the present disclosure, the first vibration device may have a same shape as a plate shape of the second vibration device.

According to one or more aspects of the present disclosure, the first vibration device may comprise four corner portions including a portion of the second main surface. The corner portion may comprise the portion which does not overlap the second main surface of the second vibration device and the second main surface of the second vibration member.

According to one or more aspects of the present disclosure, the elastic member may be disposed at the corner portion to contact the second main surface of the first vibration device.

According to one or more aspects of the present disclosure, the first vibration device may not directly contact the second vibration member.

According to one or more aspects of the present disclosure, the second vibration member may be connected to the first vibration device by an elastic member disposed at a region including a center of the second main surface of the first vibration device in a plane.

According to one or more aspects of the present disclosure, the second main surface of the first vibration device may comprise a short side and a long side. The second main surface of the second vibration member may comprise a short side and a long side. The second vibration member may be disposed so that the long side of the second main surface of the second vibration member intersects with the long side of the second main surface of the first vibration device in a plane.

According to one or more aspects of the present disclosure, the second vibration member may be disposed so that the long side of the second main surface of the second vibration member is perpendicular to the long side of the second main surface of the first vibration device in a plane.

According to one or more aspects of the present disclosure, the short side of the second main surface of the second vibration member may be parallel to the long side of the second main surface of the first vibration device.

According to one or more aspects of the present disclosure, the first vibration member may have a plate shape including a main surface. An entire surface of the first main surface of the first vibration device may contact the main surface of the first vibration member.

According to one or more aspects of the present disclosure, an entire surface of the first main surface of the second vibration device may contact the second main surface of the second vibration member.

According to one or more aspects of the present disclosure, the second vibration member may comprise four corner portions including a portion of the first main surface of the second vibration member. The elastic member may be disposed at the corner portion to be connected to the first main surface of the second vibration member. The first vibration member may be connected to the second vibration member by the elastic member.

According to one or more aspects of the present disclosure, a driving signal input to the second vibration device may have a same phase as a phase of a driving signal input to the first vibration device.

According to one or more aspects of the present disclosure, a driving signal input to the second vibration device may have a phase opposite to a phase of a driving signal input to the first vibration device.

According to one or more aspects of the present disclosure, at least one of the first vibration member and the second vibration member may comprise a metal material or stainless steel.

According to one or more aspects of the present disclosure, at least one of the first vibration device and the second vibration device may be a piezoelectric device.

A sound apparatus according to one or more aspects of the present disclosure may comprise a first vibration member, a second vibration member overlapping the first vibration member and having a size which may be smaller than a size of the first vibration member, a first vibration device disposed between the first vibration member and the second vibration member and connected to the first vibration member, and a second vibration device connected to the second vibration member. The second vibration member may be configured to be connected to the first vibration device and the first vibration member.

According to one or more aspects of the present disclosure, a center portion of the first vibration device may overlap a center portion of the second vibration device. The first vibration device and the second vibration device may be disposed in a direction in which rotation has been performed by pre-defined angular degree with respect to the center portion.

According to one or more aspects of the present disclosure, each of the first vibration device, the second vibration device, the first vibration member, and the second vibration member may have a rectangular shape or a square shape in a plane.

According to one or more aspects of the present disclosure, the sound apparatus may further comprise an elastic member disposed between a center region of the first vibration device and a center region of the second vibration device. Each of the first vibration device, the second vibration device, the first vibration member, and the second vibration member may have a square shape in a plane.

According to one or more aspects of the present disclosure, the sound apparatus may further comprise a first connection member configured to connect the second vibration member to the first vibration member, and a second connection member configured to connect the second vibration member to the first vibration device.

According to one or more aspects of the present disclosure, each of the first vibration device, the second vibration device, the first vibration member, and the second vibration member may have a square shape in a plane. The first connection member may be connected to a corner portion of the second vibration member. The second connection member may be connected between a corner portion of the first vibration device and the second vibration member.

According to one or more aspects of the present disclosure, each of the first vibration device, the second vibration device, the first vibration member, and the second vibration member may have a rectangular shape in a plane. The first connection member may be connected to a corner portion of the second vibration member. The second connection member may be connected between two first connection members adjacent to each other in a length direction of a long side of the second vibration member.

According to one or more aspects of the present disclosure, the second vibration member includes at least one material of a metal, resin, glass, wood, rubber, plastic, fiber, cloth, paper, leather, and carbon. The first vibration member may be at least one of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, and a mirror.

According to one or more aspects of the present disclosure, the first vibration member may be a display panel of a display apparatus. The display panel includes an image display surface on which an image may be displayed, and a rear surface opposite to the image display surface. Vibrations generated by the first vibration device and the second vibration device may be transferred to the rear surface of the display panel.

According to one or more aspects of the present disclosure, the display panel may vibrate based on vibrations generated by one or more of the first vibration device and the second vibration device. A sound may be output from an image displayed on the display panel.

A sound apparatus according to one or more embodiments of the present disclosure may comprise a first vibration plate having a rectangular shape including a first surface and a second surface opposite to each other, a first vibration device coupled to the first vibration plate, a second vibration plate having a rectangular shape including a first surface and a second surface opposite to each other, a second vibration device coupled to the second vibration plate, a first elastic member disposed between the first vibration plate and the second vibration plate, and coupled the first vibration plate to the second vibration plate, and a second elastic member disposed between the first vibration device and the second vibration plate, and coupled the first vibration device to the second vibration plate.

According to one or more aspects of the present disclosure, a long side of the first vibration plate and a long side of the first vibration device may be disposed in a first direction. A long side of the second vibration plate and a long side of the second vibration device may be disposed in a second direction intersect with the first direction.

According to one or more aspects of the present disclosure, the first vibration device may be coupled to the first vibration plate by a first adhesive member. The second vibration device may be coupled to the second vibration plate by a second adhesive member.

It will be apparent to those skilled in the art that various modifications and variations may be made in the present disclosure without departing from the scope of the disclosures. Thus, it is intended that the present disclosure covers the modifications and variations of this disclosure that come within the scope of the appended claims and their equivalents.

What is claimed is:

1. A sound apparatus, comprising:

a first vibration member;

a first vibration device having a rectangular shape including a first main surface and a second main surface opposite to each other and configured to vibrate based on a driving signal input thereto, the first main surface being connected to the first vibration member;

a second vibration member having a rectangular shape including a first main surface and a second main surface opposite to each other, a portion of the first main surface being connected to the first vibration member and a portion of the second main surface of the first vibration device by an elastic member; and a second vibration device having a rectangular shape including a first main surface and a second main surface opposite to each other and configured to vibrate based on a driving signal input thereto, the first main surface being connected to the second main surface of the second vibration member, wherein the first vibration device is disposed in a direction in which rotation has been performed by a certain angular degree with respect to an axis perpendicular to the first main surface of the second vibration device and the second main surface of the second vibration device.

2. The sound apparatus of claim 1, wherein the second main surface of the first vibration device comprises a portion which does not overlap the second main surface of the second vibration device and the second main surface of the second vibration member in a plane.

3. The sound apparatus of claim 2, wherein the first vibration device has a same shape as a plate shape of the second vibration device.

4. The sound apparatus of claim 2, wherein the first vibration device comprises four corner portions including a portion of the second main surface, and wherein the corner portion comprises the portion which does not overlap the second main surface of the second vibration device and the second main surface of the second vibration member.

5. The sound apparatus of claim 4, wherein the elastic member is disposed at the corner portion to contact the second main surface of the first vibration device.

6. The sound apparatus of claim 5, wherein the first vibration device does not directly contact the second vibration member.

7. The sound apparatus of claim 5, wherein the second vibration member is connected to the first vibration device by an elastic member disposed at a region including a center of the second main surface of the first vibration device in a plane.

8. The sound apparatus of claim 2, wherein the second main surface of the first vibration device comprises a short side and a long side, wherein the second main surface of the second vibration member comprises a short side and a long side, and wherein the second vibration member is disposed so that the long side of the second main surface of the second vibration member intersects with the long side of the second main surface of the first vibration device in a plane.

9. The sound apparatus of claim 8, wherein the second vibration member is disposed so that the long side of the second main surface of the second vibration member is perpendicular to the long side of the second main surface of the first vibration device in a plane.

10. The sound apparatus of claim 8, wherein the short side of the second main surface of the second vibration member is parallel to the long side of the second main surface of the first vibration device.

11. The sound apparatus of claim 1, wherein the first vibration member has a plate shape including a main surface, and wherein an entire surface of the first main surface of the first vibration device contacts the main surface of the first vibration member.

12. The sound apparatus of claim 11, wherein an entire surface of the first main surface of the second vibration device contacts the second main surface of the second vibration member.

13. The sound apparatus of claim 12, wherein the second vibration member comprises four corner portions including a portion of the first main surface of the second vibration member, wherein the elastic member is disposed at the corner portion so as to be connected to the first main surface of the second vibration member, and wherein the first vibration member is connected to the second vibration member by the elastic member.

14. The sound apparatus of claim 1, wherein a driving signal input to the second vibration device has a same phase as a phase of a driving signal input to the first vibration device.

15. The sound apparatus of claim 1, wherein a driving signal input to the second vibration device has a phase opposite to a phase of a driving signal input to the first vibration device.

16. The sound apparatus of claim 1, wherein at least one of the first vibration member and the second vibration member comprises a metal material or stainless steel.

17. The sound apparatus of claim 1, wherein at least one of the first vibration device and the second vibration device is a piezoelectric device.

18. A sound apparatus, comprising:

a first vibration member;

a second vibration member overlapping the first vibration member and having a size which is smaller than a size of the first vibration member;

a first vibration device disposed between the first vibration member and the second vibration member and connected to the first vibration member; and a second vibration device connected to the second vibration member, wherein the second vibration member is configured to be connected to the first vibration device and the first vibration member, wherein a center portion of the first vibration device overlaps a center portion of the second vibration device, and wherein the first vibration device and the second vibration device are disposed in a direction in which rotation has been performed by a pre-defined angular degree with respect to the center portion.

19. The sound apparatus of claim 18, wherein each of the first vibration device, the second vibration device, the first vibration member, and the second vibration member has a rectangular shape or a square shape in a plane.

20. The sound apparatus of claim 18, further comprising an elastic member disposed between a center region of the first vibration device and a center region of the second vibration device, wherein each of the first vibration device, the second vibration device, the first vibration member, and the second vibration member has a square shape in a plane.

21. The sound apparatus of claim 18, further comprising:

a first connection member configured to connect the second vibration member to the first vibration member; and a second connection member configured to connect the second vibration member to the first vibration device.

22. The sound apparatus of claim 21, wherein each of the first vibration device, the second vibration device, the first vibration member, and the second vibration member has a square shape in a plane, wherein the first connection member is connected to a corner portion of the second vibration member, and wherein the second connection member is connected between a corner portion of the first vibration device and the second vibration member.

23. The sound apparatus of claim 21, wherein each of the first vibration device, the second vibration device, the first vibration member, and the second vibration member has a rectangular shape in a plane, wherein the first connection member is connected to a corner portion of the second vibration member, and wherein the second connection member is connected between two first connection members adjacent to each other in a length direction of a long side of the second vibration member.

24. The sound apparatus of claim 18, wherein the second vibration member includes one of metal, resin, glass, wood, rubber, plastic, fiber, cloth, paper, leather, and carbon, and wherein the first vibration member is at least one of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, and a mirror.

25. The sound apparatus of claim 18, wherein the first vibration member is a display panel of a display apparatus, wherein the display panel includes an image display surface on which an image is displayed, and a rear surface opposite to the image display surface, and wherein vibrations generated by the first vibration device and the second vibration device are transferred to the rear surface of the display panel.

26. The sound apparatus of claim 25, wherein the display panel vibrates based on vibrations generated by one or more of the first vibration device and the second vibration device, and wherein a sound is output from an image displayed on the display panel.

27. A sound apparatus, comprising:

a first vibration plate having a rectangular shape including a first surface and a second surface opposite to each other;

a first vibration device coupled to the first vibration plate;

a second vibration plate having a rectangular shape including a first surface and a second surface opposite to each other;

a second vibration device coupled to the second vibration plate;

a first elastic member disposed between the first vibration plate and the second vibration plate, and coupled the first vibration plate to the second vibration plate; and a second elastic member disposed between the first vibration device and the second vibration plate, and coupled the first vibration device to the second vibration plate.

28. The sound apparatus of claim 27, wherein a long side of the first vibration plate and a long side of the first vibration device are disposed in a first direction, and wherein a long side of the second vibration plate and a long side of the second vibration device are disposed in a second direction intersect with the first direction.

29. The sound apparatus of claim 27, wherein the first vibration device is coupled to the first vibration plate by a first adhesive member, and wherein the second vibration device is coupled to the second vibration plate by a second adhesive member.

* * * * *